(12) United States Patent
Urabe

(10) Patent No.: US 8,190,484 B2
(45) Date of Patent: May 29, 2012

(54) ELECTRONIC COMMERCE SYSTEM AND ELECTRONIC COMMERCE METHOD

(75) Inventor: Akio Urabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 918 days.

(21) Appl. No.: 11/839,938

(22) Filed: Aug. 16, 2007

(65) Prior Publication Data

US 2007/0299739 A1 Dec. 27, 2007

Related U.S. Application Data

(63) Continuation of application No. 10/094,653, filed on Mar. 12, 2002, now Pat. No. 7,308,424.

(30) Foreign Application Priority Data

Mar. 12, 2001 (JP) ................................ 2001-069142
May 17, 2001 (JP) ................................ 2001-148005

(51) Int. Cl.
*G06Q 30/00* (2006.01)
(52) U.S. Cl. ............. 705/26.1; 705/64; 705/39; 705/18; 709/201
(58) Field of Classification Search ........................ None
See application file for complete search history.

(56) References Cited

U.S. PATENT DOCUMENTS

| | | | |
|---|---|---|---|
| 5,317,636 A | 5/1994 | Vizcaino | |
| 5,671,279 A * | 9/1997 | Elgamal | ........................ 705/79 |
| 5,715,399 A | 2/1998 | Bezos | |
| 5,724,424 A | 3/1998 | Gifford | |
| 5,727,163 A | 3/1998 | Bezos | |
| 5,883,810 A | 3/1999 | Franklin et al. | |
| 5,915,022 A * | 6/1999 | Robinson et al. | ............... 705/75 |
| 6,016,484 A | 1/2000 | Williams et al. | |
| 6,023,682 A | 2/2000 | Checchio | |

(Continued)

FOREIGN PATENT DOCUMENTS

JP 8-339407 A 12/1996

(Continued)

OTHER PUBLICATIONS

I. Taniguchi, Nippon Jitsugyo Publishing Co., Ltd., first edition, pp. 47-90, "Entry-Level Visual Technology, Easy Encryption Technique", Sep. 30, 2000 (In Japanese—Not Translated—30 pages).

(Continued)

*Primary Examiner* — Luna Champagne
(74) *Attorney, Agent, or Firm* — Oblon, Spivak, McClelland, Maier & Neustadt, L.L.P.

(57) ABSTRACT

A message, including ordering-data receiving process of receiving ordering data including price information representing a price of a target product to be purchased and personal information including ID information which has previously been given to at least one purchaser for sales, via a network a payment determination process of determining whether to pay the price of the target product to a seller, based on the price information included in the received ordering data and purchaser ID Information included in the received personal information a settlement-permission information sending process of sending, in a case where it is determined at said determining step to pay the price of the target product for the at least one purchaser, settlement permission information representing that it is determined to pay the price for the purchaser to the seller through a network, while the ID information is secret from the seller.

15 Claims, 27 Drawing Sheets

U.S. PATENT DOCUMENTS

| | | | |
|---|---|---|---|
| 6,151,588 A * | 11/2000 | Tozzoli et al. | 705/37 |
| 6,267,292 B1 | 7/2001 | Walker et al. | |
| 6,415,156 B1 * | 7/2002 | Stadelmann | 455/466 |
| 7,136,836 B1 * | 11/2006 | Washizuka et al. | 705/39 |
| 7,467,099 B2 * | 12/2008 | Kamada et al. | 705/64 |
| 2001/0039535 A1 * | 11/2001 | Tsiounis et al. | 705/71 |
| 2003/0097343 A1 * | 5/2003 | Pinizzotto | 705/75 |
| 2003/0135473 A1 * | 7/2003 | Lang et al. | 705/77 |

FOREIGN PATENT DOCUMENTS

| | | |
|---|---|---|
| JP | 9-282371 | 10/1997 |
| JP | 11-345264 | 12/1999 |
| JP | 11-353382 | 12/1999 |
| JP | 2000-76365 | 3/2000 |
| JP | 2000-148858 | 5/2000 |
| JP | 2000-322486 A | 11/2000 |
| JP | 2000-353194 | 12/2000 |
| WO | WO 00/57374 A1 | 9/2000 |
| WO | WO 0072109 A2 | 11/2000 |
| WO | WO 01/15094 A2 | 3/2001 |

OTHER PUBLICATIONS

Electronic Commerce: Canadian Customer Flock to Test of Wireless Banking. Carol Power American Banker, vol. 164, No. 94, pp. 19(1), May 18, 1999.

Japanese Office Action issued Jul. 6, 2010 in corresponding Japanese Application No. 2001-148005.

Marvin Sirbu et al., "NetBill: An Internet Commerce System Optimized for Network Delivered Services", Proceedings of the 40th IEEE Computer Society International Conference (COMPCON '95), Mar. 5, 1995, pp. 20-25.

* cited by examiner

SETTLEMENT-AGENCY COMPUTER 10

```
<ORDERING TABLE>
    <SELLER> TWOBOTTOM </SELLER>                              ———— 41
    <PRODUCT NAME> IDE HDD HAL</PRODUCT NAME>
    <PRODUCT NUMBER> DSLB-4080</PRODUCT NUMBER> ———— 42
    <UNIT PRICE>393</UNIT PRICE><NUMBER>1</NUMBER><SUBTOAL>393</SUBTOTAL>
    <PRODUCT NAME>CPU Outlet Hex 3GHz </PRODUCT NAME>
    <PRODUCT NUMBER> 4049A</PRODUCT NUMBER>
    <UNIT PRICE>515</UNIT PRICE><NUMBER>1</NUMBER><SUBTOTAL>515</SUBTOTAL>
    <TOTAL INCLUDING TAX>953</TOTAL INCLUDING TAX> ———— 46
    <PAYMENT METHOD>WJTB</PAYMENT METHOD>
    <SELLER ID>ABC123</SELLER ID>                              ———— 47
    <CUSTOMER>
        <NAME> HIOYUKI OHARA</NAME>    ———— 44
        <ZIP CODE>224-0035</ZIP CODE>
        <ADDRESS>161 SAKAE,YOKOHAMA, KANAGAWA</ADDRESS>
        <PHONE>045-590-1234</PHONE>
        <Email>xyz@abc.def.jp</Email>
    </CUSTOMER>
</ORDERING TABLE>
                                                    ———— 48
<DIGEST OF ORDERING TABLE>
iQCVAwUBOZDDzT5Ru2/4N2IFAQH1eAP9H9pBT4dhBHD95QYQto48GpJon31MkHcM
</DIGEST OF ORDERING TABLE>
```

FIG.6

```
<SETTLEMENT REQUEST>                                  S21      S31
    ┌─────────────────────────────────────────────────────────────┐
    │ <ORDERING TABLE>                                             │
    │   ┌───────────────────────────────────────────────────────┐  │
    │   │ <SELLER> TWOBOTTOM </SELLER>                          │  │
    │   │ <PRODUCT NAME> IDE HDD HAL</PRODUCT NAME>             │  │
    │   │ <PRODUCT NUMBER>DSLB-4080 </PRODUCT NUMBER>           │  │
    │   │ <UNIT PRICE>393</UNIT PRICE><NUMBER>1</NUMBER><SUBTOAL>393</SUBTOTAL> │
    │   │ <PRODUCT NAME>CPU Outlet Hex 3GHz </PRODUCT NAME>     │  │
    │   │ <PRODUCT NUMBER> 4049A</PRODUCT NUMBER>               │  │
    │   │ <UNIT PRICE>515</UNIT PRICE><NUMBER>1</NUMBER><SUBTOTAL>515</SUBTOTAL> │
    │   │ <TOTAL INCLUDING TAX>953</TOTAL INCLUDING TAX>        │  │
    │   │ <PAYMENT METHOD>WJTB</PAYMENT METHOD>                 │  │
    │   │ <SELLER ID>ABC123</SELLER ID>                         │  │
    │   │ <CUSTOMER>                                            │  │
    │   │    <NAME> HIOYUKI OHARA</NAME>                        │  │
    │   │    <ZIP CODE>224-0035</ZIP CODE>                      │  │
    │   │    <ADDRESS>161 SAKAE,YOKOHAMA, KANAGAWA</ADDRESS>    │  │
    │   │    <PHONE>045-590-1234</PHONE>                        │  │
    │   │    <Email>xyz@abc.def.jp</Email>                      │  │
    │   │ </CUSTOMER>                                           │  │
    │   └───────────────────────────────────────────────────────┘  │
    │ </ORDERING TABLE>                                            │
    │                                              48              │
    │   ┌───────────────────────────────────────────────────────┐  │
    │   │ <DIGEST OF ORDERING TABLE>                            │  │
    │   │ iQCVAwUBOZDDzT5Ru2/4N2IFAQH1eAP9H9pBT4dhBHD95QYQto48GpJon31MkHcM │
    │   │ </DIGEST OF ORDERING TABLE>                           │  │
    │   └───────────────────────────────────────────────────────┘  │
    │                                                  49          │
    │   ┌───────────────────────────────────────────────────────┐  │
    │   │ <CREDIT-CARD INFORMATION>      49a                    │  │
    │   │    <CREDIT-CARD NUMBER>9999-9999-9999</CREGIT NUMBER> │  │
    │   │    <EXPIRATION DATE>2002/05/31</EXPIRATION DATE>      │  │
    │   │    <PASSWORD>US8005963</PASSWARD>                     │  │
    │   │ </CREDIT-CARD INFORMATION>     49b                    │  │
    │   └───────────────────────────────────────────────────────┘  │
</SETTLEMENT REQUEST>
    └─────────────────────────────────────────────────────────────┘
┌─────────────────────────────────────────────────────────────────┐
│ <DIGEST OF SETTLEMENT REQUEST>                                  │
│ ySeym13PTO6YzI+HWAjv8qBnbgtN3IYu3+2wp3JY9Oh9eyKvCeq0BPaH07oJhonn│
│ </DIGEST OF SETTLEMENT REQUEST>                                 │
└─────────────────────────────────────────────────────────────────┘
                                                              50
```

FIG.7

```
<SETTLEMENT PERMIT>                                              S11
  <ORDERING TABLE>                                               S21
    <SELLER> TWOBOTTOM </SELLER>
    <PRODUCT NAME> IDE HDD HAL </PRODUCT NAME>
    <PRODUCT NUMBER> DSLB-4080</PRODUCT NUMBER>
    <UNIT PRICE>393</UNIT PRICE ><NUMBER>1</NUMBER><SUBTOAL>393</SUBTOTAL>
    <PRODUCT NAME>CPU Outlet Hex 3GHz </PRODUCT NAME>
    <PRODUCT NUMBER> 4049A</PRODUCT NUMBER>
    <UNIT PRICE>515</UNIT PRICE><NUMBER>1</NUMBER><SUBTOTAL>515</SUBTOTAL>
    <TOTAL INCLUDING TAX>953</TOTAL INCLUDING TAX>
    <PAYMENT METHOD>WJTB</PAYMENT METHOD>
    <SELLER ID>ABC123</SELLER ID>
    <CUSTOMER>
        <NAME> HIOYUKI OHARA</NAME>
        <ZIP CODE>224-0035</ZIP CODE>
        <ADDRESS>161 SAKAE,YOKOHAMA, KANAGAWA</ADDRESS>
        <PHONE>045-590-1234</PHONE>
        <Email>xyz@abc.def.jp</Email>
    </CUSTOMER>
  </ORDERING TABLE>
                                                                 48
  <DIGEST OF ORDERING TABLE>
  iQCVAwUBOZDDzT5Ru2/4N2IFAQH1eAP9H9pBT4dhBHD95QYQto48GpJon31MkHcM
  </DIGEST OF ORDERING TABLE>
                                                                 55
  <SETTELMENT PREMISSION INFORMATION>
  <PERMISSION NUMBER>WJTB9999</PERMISSION NUMBER>
  <EXPIRATION DATE> 2002/05/31 </EXPIRATION DATE>
  </SETTLEMENT PREMISSION INFORMATION>

<SETTLEMENT PERMIT>                                              56
  <SETTLEMENT PERMISSION INFORMATION>
  oNInDlDg4px1gYbHA56QtGND2IvCUYnetSeNRz2veOJPpEeJh1gB68pZoqBgAY
  </SETTLEMENT PERMISSION INFORMATION>
```

FIG.8

«ORDER-RECEPTION TABLE>     S22

<ORDERING TABLE>     S21

<SELLER> TWOBOTTOM </SELLER>
<PRODUCT NAME> IDE HDD HAL </PRODUCT NAME>
<PRODUCT NUMBER> DSLB-4080</PRODUCT NUMBER>
<UNIT PRICE>393</UNIT PRICE ><NUMBER>1</NUMBER><SUBTOAL>393</SUBTOTAL>
<PRODUCT NAME>CPU Outlet Hex 3GHz </PRODUCT NAME>
<PRODUCT NUMBER> 4049A</PRODUCT NUMBER>
<UNIT PRICE>515</UNIT PRICE><NUMBER>1</NUMBER><SUBTOTAL>515</SUBTOTAL>
<TOTAL INCLUDING TAX>953</TOTAL INCLUDING TAX>
<PAYMENT METHOD>WJTB</PAYMENT METHOD>
<SELLER ID>ABC123</SELLER ID>
<CUSTOMER>
   <NAME> HIOYUKI OHARA</NAME>
   <ZIP CODE>224-0035</ZIP CODE>
   <ADDRESS>161 SAKAE,YOKOHAMA, KANAGAWA</ADDRESS>
   <PHONE>045-590-1234</PHONE>
   <Email>xyz@abc.def.jp</Email>
<CUSTOMER>

</ORDERING TABLE>

48

<DIGEST OF ORDERING TABLE>
iQCVAwUBOZDDzT5Ru2/4N2IFAQH1eAP9H9pBT4dhBHD95QYQto48GpJon31MkHcM
</DIGEST OF ORDERING TABLE>

57

< ORDER-RECEPTION INFORMATION>
<RECEPTION NUMBER>TB9999</RECEPTION NUMBER>
<DELIVERY DATE>2001/01/015</DELIVERY DATE>
</OREDER-RECEPTION INFORMATION>

<OREDER-RECEPTION TABEL>/>     58

<DIGEST OF ORDER-RECEPTION TABLE>
2pgABddTWBFQacaHe5LwvbeRXVv6vI+LzuRUvRVQ7GPUK/hvuzUfJDEbToidJWZB
</DIGEST OF ORDER-RECEPTION TABLE>

FIG.9

<REQUEST MESSAGE FOR ONE-TIME CREDIT-CARD INFORMATION>

<REQUESTER>
    <NAME> TARO RIKO <NAME/>
    <CREDIT CARD NUMBER>9999-9999-9999<CREDIT CARD NUMBER/>
    <EXPIRATION DATE>2002/04/21<EXPIRATION DATE/>
    <PASSWORD>US8005963<PASSWORD>
</REQUESTER>

<REQUESTED ONE-TIME CREDIT-CARD INFORMATION>
    <EXPIRATION DATE>2001/10/01</EXPIRATION DATE>
    <PASSWORD>US8005963</PASSWORD>
</REQUESTED ONE-TIME CREDIT-CARD INFORMATION>

</REQUEST MESSAGE FOR ONE-TIME CREDIT-CARD INFORMATION>

FIG.18

<ONE-TIME CREDIT-CARD INFORMATION MESSAGE>
  <ONE-TIME CREDIT-CARD INFORMATION>
    <ONE-TIME CREDIT-CARD NUMBVER>
    0000-0000-0000
    </ONE-TIME CREDIT-CARD NUMBVER/>
    <PASSWORD>US8005964</PASSWORD/>
  <ONE-TIME CREDIT-CARD INFORMATION/>
</ONE-TIME CREDIT-CARD INFORMATION MESSAGE/>

FIG.19

```
<SETTLEMENT REQUEST>
    <ORDERING TABLE>
        <SELLER> TWOBOTTOM </SELLER>
        <PRODUCT NAME> IDE HDD HAL 75GB</PRODUCT NAME>
        <PRODUCT NUMBER>DSLB-4080 </PRODUCT NUMBER>
        <UNIT PRICE>393</UNIT PRICE><NUMBER>1</NUMBER><SUBTOAL>393</SUBTOTAL>

<PRODUCT NAME>CPU Outlet Hex 3GHz </PRODUCT NAME>
        <PRODUCT NUMBER> 4049A</PRODUCT NUMBER>
        <UNIT PRICE>515</UNIT PRICE><NUMBER>1</NUMBER><SUBTOTAL>515</SUBTOTAL>
        <TOTAL INCLUDING TAX>953</TOTAL INCLUDING TAX>
        <PAYMENT METHOD>WJTB</PAYMENT METHOD>
        <SELLER ID>ABC123</SELLER ID>           INFORMATION SPECIFYING SELLER
        <CUSTOMER>
            <NAME> HIROYUKI OHARA</NAME>
            <ZIP CODE>224-0035</ZIP CODE>
            <ADDRESS>16-1 SAKAE-CHO,YOKOHAMA, KANAGAWA</ADDRESS>
            <PHONE>045-590-1234</PHONE>
            <Email>xyz@abc.def.jp</Email>
        </CUSTOMER>
    </ORDERING TABLE>             MESSAGE DIGEST CREATED BASED ON ORDER TABLE <DIGEST OF ORDERING TABLE>
    iQCVAwUBOZDDzT5Ru2/4N2IFAQH1eAP9H9pBT4dhBHD95QYQto48GpJon31MkHcM
    </DIGEST OF ORDERING TABLE>

<ONE-TIME CREDIT-CARD INFORMATION>
        <ONE-TIME CREDIT-CARD NUMBER>0000-0000-0000</CREGIT NUMBER>
        <EXPIRATION DATE>2002/05/31</EXPIRATION DATE>
        </PASSWORD>US8005964<PASSWARD>
    </ONE-TIME CREDIT-CARD INFORMATION>
</SETTLEMENT REQUEST>
```

FIG.20

<CORRESPONDANCE MESSAGE>

<CREDIT CARD INFORMATION>
    <CREDIT CARD NUMBER> 9999-9999-9999</CREDIT CARD NUMBER>
    <EXPIRATION DATE> 2002/04/01</EXPIRATION DATE>
    </PASSWORD>US8005963<PASSWORD>
  </CREDIT CARD INFORMATION>

<ONE-TIME CREDIT CARD INFORMATION>
    <ONE-TIME CREDIT CARD NUMBER>0000-0000-0000</ONE-TIME CREDIT CARD NUMBER>
    <EXPIRATION DATE>2001/10/01</EXPIRATION DATE>
    <PASSWORD>US8005964</PASSWORD>
  </ONE-TIME CREDIT CARD INFORMATION>

</CORRESPONDANCE MESSAGE>

FIG.21

```
<EXAMINATION-REQUEST MESSAGE>
    <ORDERING TABLE>
        <SELLER> TWOBOTTOM </SELLER>
        <PRODUCT NAME> IDE HDD HAL</PRODUCT NAME>
        <PRODUCT NUMBER>DSLB-4080 </PRODUCT NUMBER>
        <UNIT PRICE>393</UNIT PRICE><NUMBER>1</NUMBER><SUBTOAL>393</SUBTOTAL>
        <PRODUCT NAME>CPU Outlet Hex 3GHz </PRODUCT NAME>
        <PRODUCT NUMBER> 4049A</PRODUCT NUMBER>
        <UNIT PRICE>515</UNIT PRICE><NUMBER>1</NUMBER><SUBTOTAL>515</SUBTOTAL>
        <TOTAL INCLUDING TAX>953</TOTAL INCLUDING TAX>
        <PAYMENT METHOD>WJTB</PAYMENT METHOD>
        <SELLER ID>ABC123</SELLER ID>
        <CUSTOMER>
            <NAME> HIROYUKI OHARA</NAME>
            <ZIP CODE>224-0035</ZIP CODE>
            <ADDRESS>16-1 SAKAE-CHO,YOKOHAMA, KANAGAWA</ADDRESS>
            <PHONE>045-590-1234</PHONE>
            <Email>xyz@abc.def.jp</Email>
        </CUSTOMER>
    </ORDERING TABLE>
                                            MESSAGE DIGEST OF ORDER TABLE <DIGEST OF ORDERING TABLE>
    iQCVAwUBOZDDzT5Ru2/4N2IFAQH1eAP9H9pBT4dhBHD95QYQto48GpJon31MkHcM
    </DIGEST OF ORDERING TABLE>

<ONE-TIME CREDIT-CARD INFORMATION>
        <ONE-TIME CREDIT-CARD NUMBER>0000-0000-0000</CREGIT NUMBER>
        <EXPIRATION DATE>2002/05/31</EXPIRATION DATE>
        <PASSWORD>US8005964</PASSWARD>
    </ONE-TIME CREDIT-CARD INFORMATION>
</EXAMINATION-REQUEST MESSAGE>
```

FIG.22

<YES/NO MESSAGE>

<ORDERING TABLE>
<SELLER> TWOBOTTOM </SELLER>
<PRODUCT NAME> IDE HDD HAL</PRODUCT NAME>
<PRODUCT NUMBER>DSLB-4080</PRODUCT NUMBER>
<UNIT PRICE>393</UNIT PRICE/><NUMBER>1</NUMBER><SUBTOAL>393</SUBTOTAL>
<PRODUCT NAME>CPU Outlet Hex 3GHz </PRODUCT NAME>
<PRODUCT NUMBER> 4049A</PRODUCT NUMBER>
<UNIT PRICE>515</UNIT PRICE><NUMBER>1</NUMBER><SUBTOTAL>515</SUBTOTAL>
<TOTAL INCLUDING TAX>953</TOTAL INCLUDING TAX>
<PAYMENT METHOD>WJTB</PAYMENT METHOD>
<SELLER ID>ABC123</SELLER ID>
<CUSTOMER>
   <NAME> HIROYUKI OHARA</NAME>
   <ZIP CODE>224-0035</ZIP CODE>
   <ADDRESS>16-1 SAKAE-CHO,YOKOHAMA, KANAGAWA</ADDRESS>
   <PHONE>045-590-1234</PHONE>
   <Email>xyz@abc.def.jp</Email>
</CUSTOMER>
</ORDERING TABLE>

NEWLY-OBTAINED MESSAGE DIGEST OF ORDER TABLE

<DIGEST OF ORDERING TABLE>
iQCVAwUBOZDDzT5Ru2/4N2IFAQH1eAP9H9pBT4dhBHD95QYQto48GpJon31MkHcM
</DIGEST OF ORDERING TABLE>

<YES/NO INFORMATION>
   <YES/NO NUMBER>WJTB999999</YES/NO NUMBER>
   <EXPIRATION DATE>2002/05/31</EXPIRATION DATE>
</YES/NO INFORMATION>

</YES/NO MESSAGE>

FIG.23

```
<ORDER-RECEPTION MESSAGE>
    <ORDERING TABLE>
        <SELLER> TWOBOTTOM </SELLER>
        <PRODUCT NAME> IDE HDD HAL 75GB</PRODUCT NAME>
        <PRODUCT NUMBER>DSLB-4080 </PRODUCT NUMBER>
        <UNIT PRICE>393</UNIT PRICE><NUMBER>1</NUMBER><SUBTOAL>393</SUBTOTAL>
        <PRODUCT NAME>CPU Outlet Hext 3GHz </PRODUCT NAME>
        <PRODUCT NUMBER> 4049A</PRODUCT NUMBER>
        <UNIT PRICE>515</UNIT PRICE><NUMBER>1</NUMBER><SUBTOTAL>515</SUBTOTAL>
        <TOTAL INCLUDING TAX>953</TOTAL INCLUDING TAX>
        <PAYMENT METHOD>WJTB</PAYMENT METHOD>
        <SELLER ID>ABC123</SELLER ID>
        <CUSTOMER>
            <NAME> HIROYUKI OHARA</NAME>
            <ZIP CODE>224-0035</ZIP CODE>
            <ADDRESS>16-1 SAKAE-CHO,YOKOHAMA, KANAGAWA</ADDRESS>
            <PHONE>045-590-1234</PHONE>
            <Email>xyz@abc.def.jp</Email>
        </CUSTOMER>
    </ORDERING TABLE>
                                    PROVIDED MESSAGE DIGEST OF ORDER TABLE
    <DIGEST OF ORDERING TABLE>
    iQCVAwUBOZDDzT5Ru2/4N2IFAQH1eAP9H9pBT4dhBHD95QYQto48GpJon31MkHcM
    </DIGEST OF ORDERING TABLE>

<ORDER-RECEPTION INFORMATION>
        <ORDER-RECEPTION NUMBER>TB999999</ORDER-RECEPTION NUMBER>
        <DELIVERY DATE>2001/10/01</DELIVERY DATE>
    </ORDER-RECEPTION INFORMATION>
</ORDER-RECEPTION MESSAGE>
```

FIG.24

ELECTRONIC COMMERCE SYSTEM AND ELECTRONIC COMMERCE METHOD

CROSS-REFERENCE TO RELATED APPLICATIONS

This patent application is a Continuation of and claims priority to U.S. application Ser. No. 10/094,653, filed on Mar. 12, 2002, and further claims priority to Japanese Patent Application Nos. 2001-069142, filed Mar. 12, 2001 and 2001-148005 filed May 17, 2001. The contents of these applications are incorporated herein by reference in their entirety.

BACKGROUND OF THE INVENTION

1. Field of the Invention

The present invention relates to an electronic commerce system and electronic commerce method, to be used by at least one purchaser, a seller and settlement agency.

2. Description of the Related Art

For example, U.S. Pat. No. 6,016,484 (System Method and Articles of Manufacture for Network Electronic Payment Instrument and Certification of Payment and Credit Collection Utilizing a Payment) discloses a technique regarding digital money. The disclosure of the this publication is herein incorporated by reference this specification.

As the Internet is widely used, there are various kinds of electronic commerce systems conducted over the Internet. One kind of electronic commerce system is for conducting electronic commerce using a predetermined calculation system and the Internet. There are two types of settlement, one of which is "prepaid settlement" and the other of which is deferred payment", in the electronic settlement of the Internet. The typical example of the "prepaid settlement" includes a prepaid-card payment method, while the typical example of the "deferred payment" includes a credit-card payment method.

In the prepaid-card payment method, the user (purchaser) pays a predetermined amount of money to a prepaid-card issuer, and the seller allows the purchaser to purchase goods in the range of the paid amount of money. In the "prepaid settlement", the settlement can be made each time a business transaction is done. In addition, in the "prepaid settlement", the user may possibly leave a certain amount of money without spending all. In the case where the prepaid-card company is bankrupted, the user may not be able to get back the money that the user has not spent yet.

Such a problem does not occur in the "deferred payment" method employing the credit card, etc. In the "deferred payment" method, the purchaser decides the goods to purchase first, and then the settlement will be made for the total price of the goods, in accordance with the number affixed to the credit card of possessed by the purchaser.

Those techniques regarding the deferred payment method employing the credit card are disclosed in: Unexamined Japanese Patent Application KOKAI Publication No. H11-353382; Unexamined Japanese Patent Application KOKAI Publication No. H11-345264; U.S. Pat. No. 5,317,636 (Method and Apparatus for Securing Credit Card Transactions); U.S. Pat. No. 5,671,279 (Electronic Commerce Using a Secure Courier System); U.S. Pat. No. 5,715,399 (Secure Method and System for Communicating a List of Credit Card Numbers Over a Non-secure Network); U.S. Pat. No. 5,724,424 (Digital Active Advertising); U.S. Pat. No. 5,727,163 (Secure Method for Communicating Credit Card Data When Placing an Order on a Non-secure Network); and U.S. Pat. No. 6,023,682 (Method and Apparatus for Credit Card Purchase Authorization Utilizing a Comparison of a Purchase Token with Test Information). The disclosure of the above publications are herein incorporated by reference in this specification.

There are various problems wherein the "deferred payment" method using the credit card is employed in the electronic commerce. Specifically, according to the "deferred payment" method, it is necessary to transmit the number of the purchaser's credit card number through the Internet, but the transmitted credit card number may possibly be wiretapped by someone on the Internet. To securely transmit the credit card number through the Internet, it is proposed to encrypt information to be transmitted over the Internet. Those techniques for encrypting information includes SSL (Secure Socket Layer), SHTTP (Secure Hyper Text Transfer Protocol), PEM (Privacy Enhancement for Internet Electronic Mail), MOSS (MIME Object Security Services), IPSP, etc.

Even if the credit card number is transmitted in the encrypted form, the electronic commerce method employing the credit card has the following problems:

U.S. Pat. No. 5,727,163 discloses an electronic commerce technique for performing electronic commerce over the Internet. According to this technique, when a user shops at an electronic mall, the user is to specify the goods to purchase, the delivery place and the payment method so as to fill in an order sheet. At this time, the user is to transmit a part of his/her credit-card number but not in a complete form. Upon reception of the order sheet, a person in charge of the electronic mall calls the user by dialing the phone number of the user which has been written in the order sheet beforehand. At this time, the user is asked to input his/her phone number by pressing the dial of the telephone. Then, the system of the electronic mall compares the input number and the number written in the order sheet. As a result of the comparison, in the case where the input number coincides with the number of the order sheet, the order is succeeded.

Unexamined Japanese Patent Application KOKAI Publication No. H11-345264 discloses an electronic commerce technique. According to this technique, to perform the settlement of the bill using a credit card, there is employed a mobile communications terminal having a system for transmitting the transmitter number, instead of using a credit inquiry communications device.

Even with the above technique wherein the credit card number can not securely be transmitted, there still remains a problem for the purchaser. According to this technique, the purchaser provides the seller with his/her credit-card number. That is, the purchaser has to give the seller the credit card number, together with the purchaser's personal information including his/her name, address, phone number, etc. Thus, it is possible that the credit card number is used by the seller for some unintended purposes. In addition, in the case where the personal information is sold to the third party after the seller is bankrupted or something, the purchaser can have serious problems.

U.S. Pat. No. 5,671,279 discloses an electronic commerce technique. According to this technique, the purchaser sends his/her credit-card number after being encrypted, the seller sends the encrypted credit card number to a settlement agency, and the settlement agency examines whether the settlement can be made for the purchaser. Even with this technique, the purchaser's credit card number can still be kept by the seller.

The most secure electronic commerce method is that the purchaser does not let the seller know his/her credit card number, and still purchases the desired goods.

U.S. Pat. No. 5,724,424 discloses such a technique for performing electronic commerce while the purchaser's credit-card number is not available to the seller. According to this technique, the purchaser attaches his/her credit card number to the order sheet, and sends the order sheet to the settlement agency through the Internet. When the settlement agency allows the payment to be made, the agency issues a payment permit to the purchaser. Then, the purchaser sends the permit and the order sheet to the seller using the Internet.

However, according to this method, in the case where the purchaser has malice, it involves the financial risk for the seller or settlement agency. For example, there is a purchaser who can purchase goods or services at maximum of "¥50,000" at each business transaction. This purchaser may make alteration in the order sheet for goods or services of ¥500,000, and rewrites "¥500,000" to "¥50,000", and gets a permit from the settlement agency for the goods or services of "¥500,000" at the price of "¥50,000". Then, the purchaser provides the seller with the permit including the order sheet of ¥500,000. Without any suspiciousness, the seller may deliver the ordered goods to the purchaser. Unfortunately, the seller gets only ¥50,000 for the delivered goods afterwards. Alternatively, the user having malice may forge the permit itself.

The above publication simply describes the permit issued by the settlement agency as one which can not be altered, and does not disclose a specific technique for forming the permit. In any technique, even if the permit is encrypted, as long as the user is malicious, the permit may still possibly be altered. In order to completely eliminate this possibility, it is necessary not to provide the purchaser with the permit.

Unexamined Japanese Patent Application KOKAI Publication No. H11-353382 discloses an electronic commerce system for realizing secure and economical electronic commerce. According to this technique, the purchaser sends a purchaser ID number directly to the settlement agency, not via the seller. The seller forms settlement-agency data including a plurality of pieces of charge data for each purchaser at predetermined intervals, and create settlement data in association with the formed settlement-agency data. Then, the seller sends the settlement data to the settlement agency, and sends to the purchaser the settlement-agency data, as asking information for asking the purchaser to send the provided ID number to the settlement agency. That is, the seller calculates and settles the bill for each purchaser at predetermined intervals, and instructs the purchaser to send the ID number to the settlement agency. Hence, even according to this method, as long as the purchaser is malicious, the electronic commerce according to this method involves financial risk for the seller and settlement agency. Because the goods or services have already been provided to the purchaser, the seller can not be paid for the ordered goods or services unless the purchaser has enough money to pay.

Further, there is disclosed a technique for realizing an electronic settlement system and an electronic-commerce services provider system. This relates to an electronic-settlement permission system in the electronic commerce, such as the one-line shopping through the Internet. According to this technique, it is prevented to spread the personal information that should be kept unavailable to any third party, such as the credit card number, over the Internet. Further, the settlement agency calls back the user terminal through a public network, so that the secure electronic commerce can be realized with ease. The settlement agency needs both of the settlement data provided from the seller and the ID number from the purchaser, to perform settlement. Hence, the terminal used by the settlement agency needs to store information, having being input before both of the above information are transmitted, in a predetermined memory area, so that a part of the memory area is mostly occupied by for nothing. Before the settlement is successfully performed, the settlement data and the transmission of the ID number are transmitted separately, i.e. the transmission is done at least twice. In this structure, the resources of the network are not effectively used.

U.S. Pat. No. 5,317,636 discloses an electronic commerce method. According to this method, the smart card replaces the credit card, and an order number, representing how many business transactions will have been made including a currently-processed transaction, is encrypted and shown. This order number is used as a password of the credit card. A computer which is to perform the user authentication deciphers the password so as to obtain the order number, using a predetermined method. This computer authenticates the user by determining whether the deciphered password coincides with one stored in the computer. According to this method, it is necessary to prepare the smart card in place of the credit card, and the order number needs to be encrypted.

U.S. Pat. No. 5,671,279 discloses a technique for securely performing payment using the credit card, through a public telephone line through which information may possibly be wiretapped. According to this method, the user sends the encrypted credit-card number to the seller, and the seller sends the encrypted credit card number as is to the settlement agency. Then, the settlement agency carries out the user authentication process based on the sent credit card number. According to this technique, even the credit card number is encrypted, the credit card number is still given to the seller. Hence, it involves the financial risk for the purchaser.

U.S. Pat. No. 5,715,399 discloses an electronic commerce technique. According to this technique, in the case where the electronic mall system has already obtained a plurality of credit cards of a user having currently ordered some goods to be purchased, the system asks the user to select one of the plurality of credit cards for this-time transaction. At this time, the credit card number is not fully displayed, but partially displayed. In this case, even if the third party reads the credit card number over the purchaser's shoulder, the credit card number can not fully be recognized by the third party. However, the credit card number has already been given to the electronic mall system in its complete form, so that this system may possibly involve the financial risk for the purchaser.

SUMMARY OF THE INVENTION

The present invention has been made in consideration of the above. It is accordingly an object of the present invention to provide a system and method for realizing commerce or transaction without letting seller know information of a purchaser(s), such as his/her credit card information, debit card information, etc.

Another object thereof is to provide a system and method for realizing commerce or transaction without any financial risk for a seller(s) or settlement agency(s).

Still another object thereof is to provide a system and method for securely performing commerce or transaction.

To achieve the objects, according to the first aspect of the present invention, there is provided is an electronic commerce system for dealing at least one product (item, goods, or service), said system comprising a purchaser system, a seller system and a settlement system, and wherein said seller system creates ordering data including purchaser information specifying at least one purchaser and information specifying the at least one product to be purchased, and sends the created ordering data to said purchaser system through an electronic medium, said purchaser system attaches, to the ordering data, purchaser ID (identification) information which has been provided from a settlement agency to said at least one purchaser in advance, and sends the ordering data with the purchaser ID information attached thereto to said settlement system through an electronic medium, and said settlement system determines whether to pay a predetermined amount of money for the at least one product to a seller for said at least one purchaser, based on the ordering data and purchaser ID information sent from said purchaser system, and sends information specifying the at least one purchaser and the product to be purchased and also settlement permission information representing to said seller system through an electronic medium.

According to the second aspect of the present invention, there is provided is an electronic commerce device comprising:

a communications unit which sends and receives data to and from another electronic commerce device;

a payment determiner which receives ordering data including price information representing a price of at least one product to be purchased and personal information including purchaser ID (identification) information which has been given in advance to at least one purchaser, from a purchaser terminal used by the at least one purchaser through said communications unit, and determines whether to pay for the at least one product to a seller for the at least one purchaser based on the received ordering data and personal information; and a settlement-information creator which creates (generates) settlement permission information, in a case where said payment determiner determines to pay for the at least one product to said seller for the at least one purchaser, and sends the settlement permission information to a seller terminal used by the seller through said communications unit while the personal information of the at least one purchaser is kept secret from the seller.

To achieve the objects, according to the third aspect of the present invention, there is provided is an electronic commerce device comprising:

an ordering-data creator which creates ordering data including price information of at least one product that at least one purchaser wants to purchase;

a recorder which writes the ordering data onto a recording medium, to provide a purchaser terminal used by at least one purchaser with the ordering data; and a receiver which receives settlement permission information and provides a seller to be providing the at least one product with the received settlement permission information, in a case where it is determined that the settlement agency is to pay for the at least one product and in a case where an agency terminal used by a settlement agency outputs the settlement permission information, based on data communications performed between the purchaser terminal which reads the ordering data written onto the recording medium and the agency terminal used by the settlement agency which may pay for the at least one product for the purchaser.

To achieve the objects, according to the fourth aspect of the present invention, there is provided is an electronic commerce device comprising:

an ordering-data creator which creates ordering data including price information of at least one product that at least one purchaser desires to purchase, in a case where product information representing the at least one product is input;

a sender which sends the ordering data to a purchaser terminal used by the at least one purchaser; and a receiver which receives settlement permission information and provides a seller to be providing the at least one product with the received settlement permission information, in a case where it is determined that a settlement agency is to pay for the at least one product and a settlement terminal used by the settlement agency outputs the settlement permission information, based on data communications performed between a purchaser terminal used by the at least one purchaser and the settlement terminal used by the settlement agency to be paying for the at least one product.

To achieve the objects, according to the fifth aspect of the present invention, there is provided is an electronic commerce device comprising:

an input unit which inputs ordering data, which is created by a seller terminal used by a seller to be providing at least one product and which includes price information of the at least one product that at least one purchaser desires to purchase, and personal information including purchaser ID (identification) information which has been given in advance to the at least one purchaser for credit sales; and a settlement-request-message sender which creates a settlement request message including the personal information and the ordering data, sends the created settlement request message to a settlement terminal used by a settlement agency which may pay the at least one product to a seller for the purchaser, instructs said settlement terminal to determine whether to pay for the at least one product for the purchaser, and instructs said settlement terminal to send settlement permission information to said seller terminal while the personal information is kept secret from the seller, in a case where it is determined to pay for the at least one product for the purchaser.

To achieve the objects, according to the sixth aspect of the present invention, there is provided is an electronic commerce device comprising:

an ordering-data creator which creates ordering data including price information of at least one product that at least one purchaser desires to purchase, in a case where the at least one purchaser inputs product information of the at least one product;

an ordering-data provider which sends the ordering data to a purchaser terminal, which is used by the at least one purchaser and affixes personal information including purchaser ID (identification) information provided to the at least one purchaser in advance for credit sales; and a reception processor which receives data items including settlement permission information representing that the at least one product is to be paid for the purchaser, and provides the settlement permission information a seller of the at least one product, in a case where the data items are sent form a settlement terminal used by a settlement agency to be paying for the at least one product for the purchaser, as a result that the ordering data is provided to the purchaser terminal.

To achieve the objects, according to the eighth aspect of the present invention, there is provided is a system comprising a purchaser system, a seller system, a payment agency system and an ID (identification) information issuing system, and wherein a payment agency provides at least one purchaser of at least one product with credit information and ID information corresponding to the at least one purchaser;

said purchaser system sends ID information to said ID information issuing system, and requests said ID information issuing system for one-time ID information, and sends the one-time ID information provided from the ID information issuing system to the seller system;

said ID information issuing system issues one-time identification information, in response to a request from said purchaser system, provides corresponding information representing the one-time ID information and the ID information in association with each other to said payment agency system;

said seller system sends the one-time ID information sent from said purchaser system to said payment agency system, so as to request said payment agency system to pay for the at least one product for the at least one purchaser; and said payment agency system determines ID information of the at least one purchaser based on the one-time ID information sent from the seller system, determines whether to pay for the at least one product based on the determined ID information, and sends a result of the determination to the seller system.

To achieve the objects, according to the ninth aspect of the present invention, there is provided is a one-time ID (identification) information issuing system to be used in a transaction wherein: a one-time ID information is issued to a person who is assigned ID information for payment previously from a payment agency; the issued one-time ID information is sent to the parson and the payment agency; the person sends the issued one-time ID information to a seller in a business transaction; the seller sends the one-time ID information of the person to a payment agency; the payment agency obtains original ID information for payment of the person based on the sent one-time ID information and determines whether to pay to the seller for the business transaction based on the obtained original ID information for payment and pays to the seller for the business transaction, in a case where it is determined to pay for the business transaction, said one-time ID information issuing system comprising:

storage means for storing ID information for payment previously assigned to a user, and one-time ID information providing means for issuing the one-time ID information toward the user in response to a request, having ID information attached thereto and being sent from a terminal of the user, providing the one-time ID information to the user, and providing a payment agency system with corresponding information representing the one-time ID information and the ID information in association with each other.

To achieve the objects, according to the tenth aspect of the present invention, there is provided is a purchaser system to be used by a purchaser and to be used in a transaction wherein: a one-time ID information is issued to a person who is assigned ID information for payment previously from a payment agency; the issued one-time ID information is sent to the parson and the payment agency; the person sends the issued one-time ID information to a seller in a business transaction; the seller sends the one-time ID information of the person to a payment agency; the payment agency obtains original ID information for payment of the person based on the sent one-time ID information and determines whether to pay to the seller for the business transaction based on the obtained original ID information for payment, and pays to the seller for the business transaction, in a case where it is determined to pay for the business transaction, and said purchaser system comprising:

means for providing ID information for deferred payment, previously assigned to a user, and for requesting one-time ID information issuing means for issuing one-time ID information to issue one-time ID information; and means for providing the issued one-time ID information, and request a system used by a seller to provide at least one product to be sold.

To achieve the objects, according to the eleventh aspect of the present invention, there is provided is a seller system to be used by a seller and to be used in a transaction wherein: a one-time ID information is issued to a person who is assigned ID information for payment previously from a payment agency; the issued one-time ID information is sent to the parson and the payment agency; the person sends the issued one-time ID information to a seller in a business transaction; the seller sends the one-time ID information of the person to a payment agency; the payment agency obtains original ID information for payment of the person based on the sent one-time ED information and determines whether to pay to the seller for the business transaction based on the obtained original ID information for payment, and pays to the seller for the business transaction, in a case where it is determined to pay for the business transaction, said seller system comprising:

means for receiving one-time ID information sent from a purchaser who desires to purchase at least one product in the business transaction, and providing the received one-time ID information to payment agency means; and means for issuing a payment permit, upon reception of information representing that payment can be made for the purchaser from the payment agency.

To achieve the objects, according to the twelfth aspect of the present invention, there is provided is a purchaser system to be used by a seller and to be used in a transaction wherein: a one-time ID information is issued to a person who is assigned ID information for payment previously from a payment agency; the issued one-time ID information is sent to the parson and the payment agency; the person sends the issued one-time ID information to a seller in a business transaction; the seller sends the one-time ID information of the person to a payment agency; the payment agency obtains original ID information for payment of the person based on the sent one-time ID information and determines whether to pay to the seller for the business transaction based on the obtained original ID information for payment, and pays to the seller for the business transaction, in a case where it is determined to pay for the business transaction, said seller system comprising requesting means for requesting the payment agency to send ID information which is provided in advance together with credit for payment to be made, and to affix the one-time ID information to the ID information;

means for receiving the one-time ID information to be provided from said payment agency; and means for providing the one-time ID information and making an order for at least one product in the business transaction.

To achieve the objects, according to the thirteenth aspect of the present invention, there is provided is a payment agency system to be used by a seller and to be used in a transaction wherein: a one-time ID information is issued to a person who is assigned ID information for payment previously from a payment agency; the issued one-time ID information is sent to the parson and the payment agency; the person sends the issued one-time ID information to a seller in a business transaction; the seller sends the one-time ID information of the person to a payment agency; the payment agency obtains original ID information for payment of the person based on the sent one-time ID information and determines whether to pay to the seller for the business transaction based on the obtained original ID information for payment, and pays to the seller for the business transaction, in a case where it is determined to pay for the business transaction, said payment agency system comprising:

storage means for storing the ID information and given-credit information of a user in association with each other;

means for receiving and storing the ID information and given-credit information in association with each other; and determination means for receiving the one-time ID information and price information regarding a price of at least one product in the business transaction, from a seller system, discriminating ID information from the received one-time ID information, and determining whether currently-requested payment can be made based on given-credit information corresponding to the discriminated ID Information; and means for sending a result of the determination performed by said determination means to said seller system.

To achieve the objects, according to the fourteenth aspect of the present invention, there is provided is a method comprising:

an ordering-data receiving process of receiving ordering data including price information representing a price of a target product to be purchased and personal information including ID information which has previously been given to at least one purchaser for credit sales, via a network;

a payment determination process of determining whether to pay the price of the target product to a seller, based on the price information included in the received ordering data and purchaser ID Information included in the received personal information; and a settlement-permission information sending process of sending, in a case where it is determined at said determining step to pay the price of the target product for the at least one purchaser, settlement permission information representing that it is determined to pay the price for the purchaser to the seller through a network, while the ID information is kept secret to the seller.

To achieve the objects, according to the fifteenth aspect of the present invention, there is provided is a method comprising:

an ordering-data acquiring process of acquiring, from a seller terminal used by a seller, ordering data including price information, which represents a price of a product, and is generated and stored by the seller terminal;

a receiving process of receiving, as a settlement-request message, the ordering data and personal information including purchaser ID information which has previously been given for credit sales, from a purchaser terminal used by at least one purchaser;

a determination process of comparing the ordering data received at said receiving process and the ordering data received at said ordering-data acquiring process, and determining whether the ordering data received at said receiving process has been altered, before the product is provided to the at least one purchaser;

a payment determination process of determining whether to pay for the product to the seller for the at least one purchaser, based on the price information included in the ordering data and the purchaser ID information included in the personal information, in a case where it is determined that the ordering data received at said receiving process has not been altered at said determination process; and a settlement-information sending process of sending the settlement permission information representing that the payment can be made for the at least one purchaser and the ordering data to the seller terminal, while the personal information is kept secret from the seller, in a case where it is determined to pay the price of the product for the purchaser at said payment determination process.

To achieve the objects, according to the sixteenth aspect of the present invention, there is provided is a method comprising the steps of:

requesting a seller system to pay for a product to be purchased, using one-time deferred-payment information issued by a settlement agency system or a deferred-payment information issuer system;

requesting said settlement agency system to pay for the product based on the one-time deferred-payment information; and paying for the product for a purchaser of the product based on deferred-payment information of the purchaser which corresponds to the one-time deferred payment information.

To achieve the objects, according to the seventeenth aspect of the present invention, there is provided is a method for realizing a settlement agency system in an electronic commerce method employing a deferred payment technique, for paying a price of at least one product to be purchased by at least one purchaser, and said method comprising the steps of:

receiving, from a seller system, a request for paying for the at least one product based on one-time deferred-payment information issued to the at least one purchaser; and paying for the at least one product for the at least one purchaser, based on the deferred-payment information of the at least one purchaser corresponding to the one-time deferred-payment information.

To achieve the objects, according to the eighteenth aspect of the present invention, there is provided is a method of issuing one-time deferred-payment information, and used by a deferred-payment information issuer system in an electronic commerce, employing a deferred-payment technique for paying for at least one product, and said method comprising the steps of:

issuing new one-time deferred-payment information to a purchaser terminal at least one purchaser, in a case where the one-time deferred-payment information is requested using a message including specification information specifying the at least one purchaser from the purchaser terminal, or in a case where a settlement agency system informs that the one-time deferred-payment information has been used; and sending, to said settlement agency system, the one-time deferred-payment information issued at said issuing step and the deferred-payment information in association with each other.

To achieve the objects, according to the nineteenth aspect of the present invention, there is provided is a settlement-request method used by a seller system in an electronic commerce method employing a deferred-payment technique for paying for at least one product for at least one purchaser, and said settlement-request method comprising the steps of:

receiving a request, from a purchaser terminal used by at least one purchaser, for paying for the at least one product for the at least one purchaser, based on one-time deferred-payment information issued to the at least one purchaser; and requesting a settlement agency system to pay for the at least one product for the at least one purchaser, based on the one-time deferred-payment information.

BRIEF DESCRIPTION OF THE DRAWINGS

These objects and other objects and advantages of the present invention will become more apparent upon reading of the following detailed description and the accompanying drawings in which:

FIG. 6 is an explanatory diagram showing an example of ordering data;

FIG. 7 is an explanatory diagram showing an example of data to be sent to the computer 10;

FIG. 8 is an explanatory diagram showing a settlement permit;

FIG. 9 is an explanatory diagram showing an order-reception table;

FIG. 18 is a diagram exemplarily showing a request message for requesting one-time credit-card information, which is created by the electronic commerce system of FIG. 16;

FIG. 19 is a diagram exemplarily showing a one-time credit-card information message which is created by the electronic commerce system of FIG. 16;

FIG. 20 is a diagram exemplarily showing an order message which is created by the electronic commerce system of FIG. 16;

FIG. 21 is a diagram exemplarily showing a corresponding message which is created by the electronic commerce system of FIG. 16;

FIG. 22 is a diagram exemplarily showing an examination-request message which is created by the electronic commerce system of FIG. 16;

FIG. 23 is a diagram exemplarily showing a yes/no message which is created by the electronic commerce system of FIG. 16;

FIG. 24 is a diagram exemplarily showing an order-reception message which is created by the electronic commerce system of FIG. 16;

DETAILED DESCRIPTION OF THE PREFERRED EMBODIMENTS

First Embodiment

Figure 1:
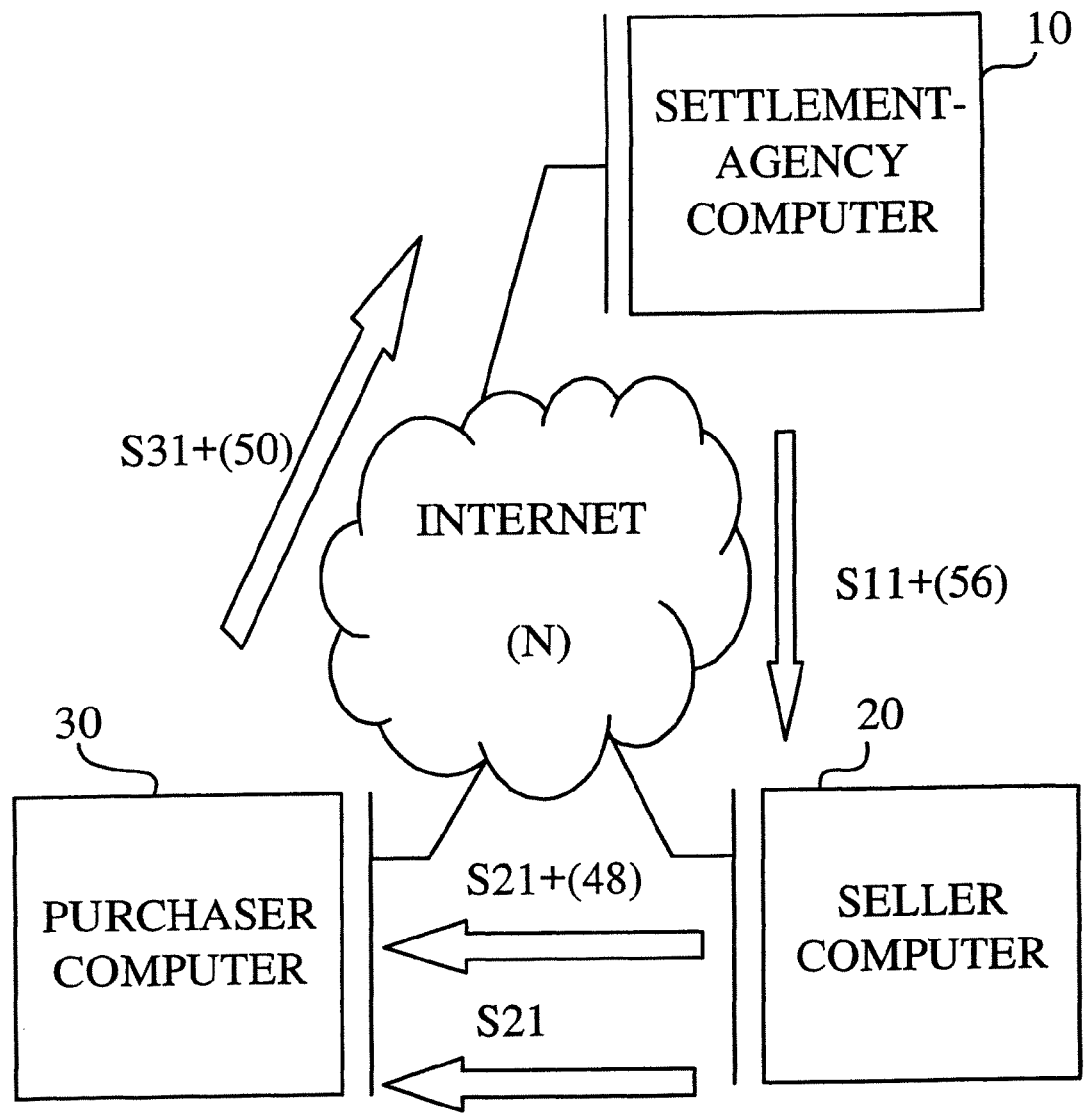
FIG. 1 is a block diagram showing an electronic commerce system, including a plurality of computer which are connected with each other, according to the first embodiment of the present invention.

FIG. 1 is a block diagram showing an electronic commerce system according to the first embodiment of the present invention.

As shown in FIG. 1, this electronic commerce system comprises a computer 10 possessed by a settlement agency, a computer 20 possessed by a seller, and a computer 30 possessed by the a purchaser, which are all connected with each other through a network N, so that data communications can be realized therebetween.

The computer 10 is a processor of a company (e.g. a credit-card company, etc.) that carries out a process for performing settlement for the purchaser in e-commerce.

The computer 20 is a processor of a seller providing (selling, renting, etc.) goods or services to purchasers, etc. The computer 30 is a terminal which is used by the purchasers of the goods or services. The network N includes the Internet, etc.

Figure 2:
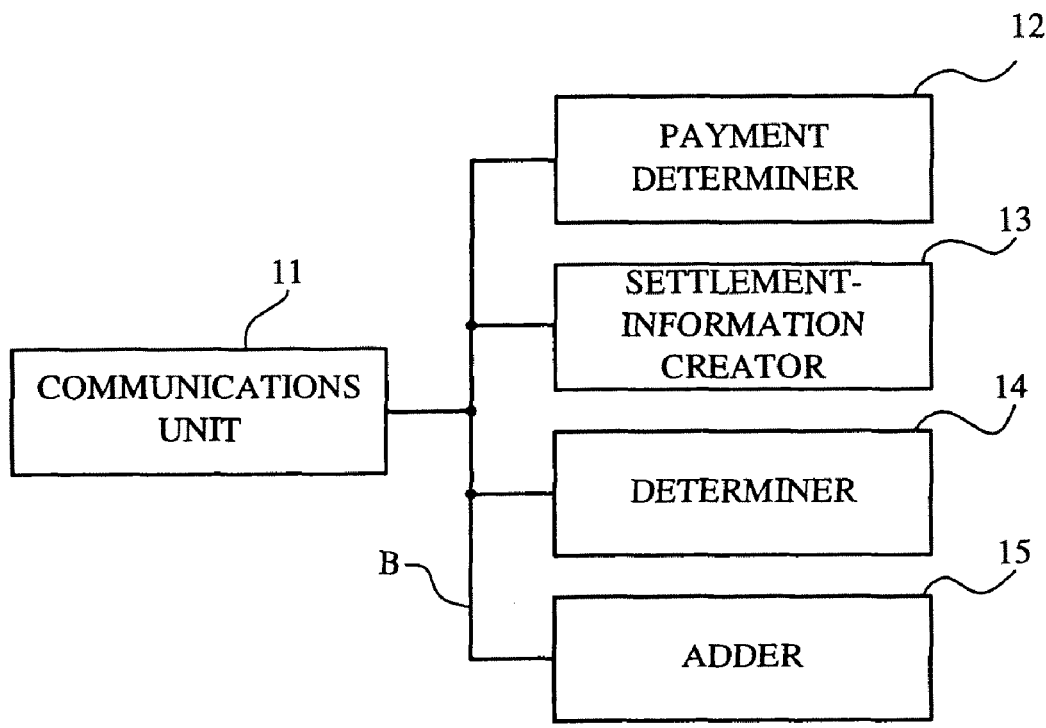
FIG. 2 is a functional block diagram showing a computer 10 shown in FIG. 1.

FIG. 2 is a functional block diagram showing the computer 10 shown in FIG. 1.

The computer 10 operates under the control of a program. The computer 10 comprises a communications unit 11, sending and receiving data to and from the computers 20 and 30, a payment determiner 12, a settlement-information creator 13, a determiner 14 and an adder 15. Each of the payment determiner 12, the settlement-information creator 13, the determiner 14 and the adder 15 may include an individual circuit, or may include a CPU (a Central Processing Unit), a memory, and the like.

The communications unit 11 transmits/receives data with the computers 20 and 30 through the network N.

The payment determiner 12 has a function for determining whether to pay a predetermined amount of money for goods or services to a seller. This determination is made, particularly upon reception of ordering data including payment information regarding a product or services, demanded by the purchaser and provided by the seller in a form of deferred payment, and also personal information including the identification number of a credit card which is purchaser identification information given to the purchaser in advance on credit card sales.

The settlement-information creator 13 generates a settlement permit or denying information to be described later.

The determiner 14 has a function for determining the validity of the received ordering data and personal information. The adder 15 has a function for creating a message digest from data items in a shorter form than the data items to be sent to the seller, and adding the created message digest to the data items. The communications unit 11, the payment determiner 12, the settlement-information creator 13, the determiner 14 and the adder 15 are connected with each other through a bus B.

Figure 3:
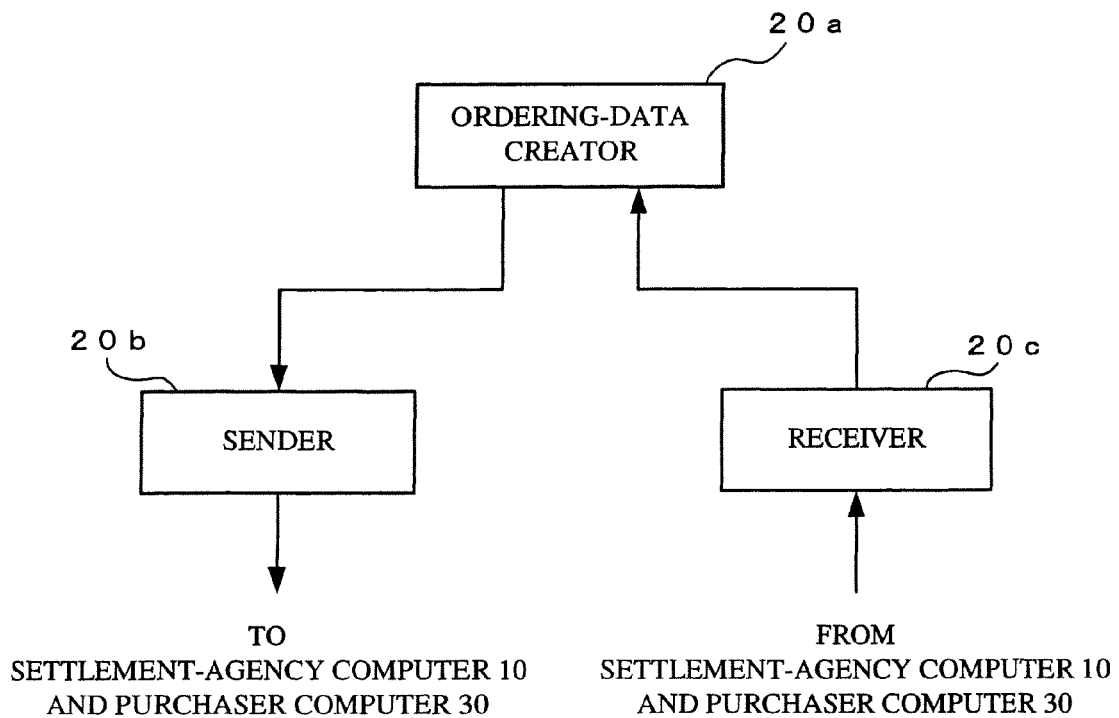
FIG. 3 is a functional block diagram showing a computer 20 shown in FIG. 1.

FIG. 3 is a functional block diagram showing the functional structure of the computer 20 shown in FIG. 1.

The computer 20 comprises an ordering-data creator (processor) 20a creating (generating) ordering data as will be explained in more detail later, a sender 20b sending ordering data to the computer 30, and a receiver 20c receiving settlement permission information, as will be explained in more detail later, from the computer 10. Each of the ordering-data creator 20a, the sender 20b and the receiver 20c may be formed by an individual circuit, or all or parts of them may be formed by a CPU, control program stored in a memory, etc.

Figure 4:
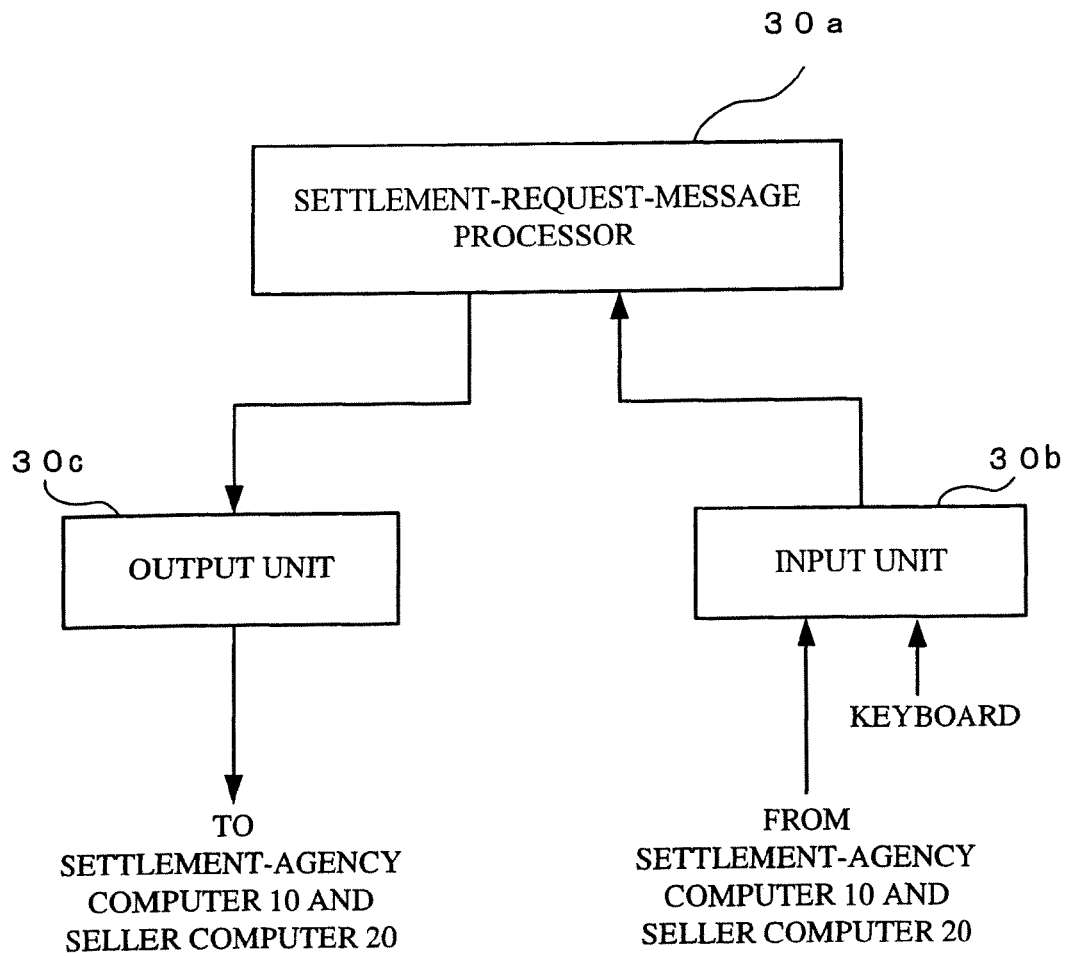
FIG. 4 is a functional block diagram showing a computer 30 shown in FIG. 1.

FIG. 4 is a functional block diagram showing the functional structure of the computer 30 shown in FIG. 1.

The computer 30 includes a personal computer having a communications system. The computer 30 includes a processor (settlement-request-message processor) 30a, an input unit 30b receiving data from an input device (keyboard, mouse, and the like) or through the network N, and an output unit 30c for transmitting data through the network N.

Figure 5:
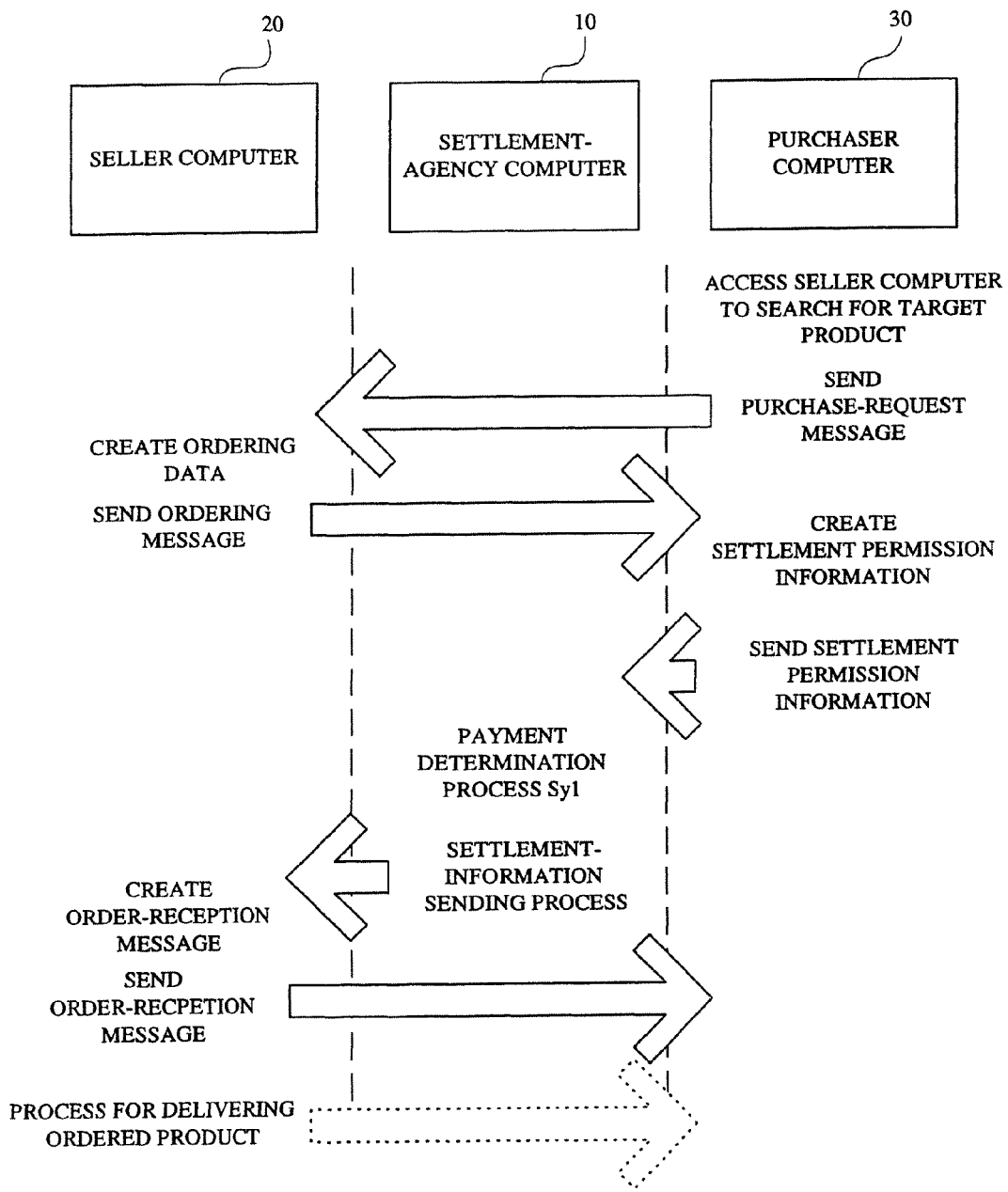
FIG. 5 is a flowchart for explaining procedures to be performed by the computers 10, 20 and 30.

FIG. 5 is a flowchart showing procedures which are performed by the computers 10, 20 and 30. The electronic commerce system using a credit card will now be described with reference to FIG. 5.

The seller provides a Web site on the Internet N using the computer 20, and shows a list of products (goods on sales or services) on the Web page. The purchaser accesses the Web page. If the purchaser wants to purchase some goods or services through the Web page, he/she inputs the type of a credit card used for deferred payment, together with transaction information (for business transactions) necessary for e-commerce and representing: goods to be purchased; number of the goods to be purchased; purchaser address; purchaser name and phone number, in accordance with instructions on the Web page. The purchaser sends, using the computer 30, the input information with the transaction information to the computer 20 of the seller. Note that such information is a purchase-request message for purchasing the desired goods or services.

FIG. 6 is an explanatory diagram showing ordering data.

The computer 20 checks information, which represents the goods to be provided and the number of ordered goods (items) and is sent from the computer 30 through the Internet N, inspects the stock of the requested goods, and calculates the total charge of the goods to be provided. After this, the computer 20 adds total charge 46 and information 47 specifying the seller itself and issued by a credit card issuer, to the transaction information representing the goods to be purchased 41, the number 42 of the goods, the address 43, the purchaser name 44 and phone number 45, thereby creating ordering data S21. The computer 20 sends thus created ordering data S21 to the computer 30.

Because information flows over the Internet N, it is preferred that the ordering data S21 be transmitted in an encoded (encrypted) form so that the transmitted information can be protected from any unauthorized access. When creating the ordering data S21, the computer 20 may compute the ordering data S21 using a one-way function such as a Hush function, generate a message digest 48 from the ordering data S21 in a shorter form than the ordering data S21, add the created message digest 48 to the ordering data 21, and send the ordering data 21 with the message digest 48 added thereto to the computer 30. The computer 20 stores the message digest 48 and the ordering data S21.

Having performed such processes, the seller can be aware of whether the contents of the ordering data S21 have been altered (destroyed), by performing the same computation to the ordering data S21. This can prevent someone from altering the ordering data S21 in malice and from making bad use of the data.

FIG. 7 is an explanatory diagram showing data items to be sent to the computer 10.

On the purchaser computer 30, the ordering data S21 received from the computer 20 is displayed and shown to the purchaser, so that the purchaser can check whether the ordering data S21 conforms to what he/she requested.

In the case where the ordering data S21 conforms to the purchaser request, the purchaser inputs credit-card information 49, such as a credit-card number 49a, a password 49b and the like necessary to settle the bill, using the computer 30, and generates data items S31 including the ordering data S21 with the credit-card information 49 added thereto. Then, the computer 30 sends the data items S31 to the computer 10 possessed by the settlement agency. When the data items, including the ordering data S21 with the message digest 48 attached thereto, are received from the computer 20, the computer 30 generates the data items S31 including the ordering data S21 and the message digest 48 with the credit-card information 49 attached thereto. Then, the computer 30 sends thus generated data items 31 to the computer 10 as a settlement-request message.

Usually, the credit-card information 49, including personal information, such as the credit-card number 49a, the password 49b, should not be given to any persons other than the purchaser him/herself and the settlement agency. Thus, when serving the data items S31 including the credit-card information 49 on the Internet, it is preferred that information be encoded in order to protect the information from any unauthorized access. On the assumption that the data items S31 will be altered before completely received by the computer 10, likewise the computer 20, the computer 30 can create a message digest 50 and add the created message digest 50 to the data items S31.

In the case where to add the message digest 50 to the data items S31, the computer 30 performs computation, using a one-way function such as a Hush function, for the data items S31 including the ordering data S21 in combination with the credit-card information 49 or for the data items S31 including the ordering data S21, the message digest 48 in combination with the credit-card information 49. Having done this computation, the computer 30 can generate the message digest 50 by encoding the data items S31 in a shorter form than the data items S31 The computer 30 adds the created message digest 50 to the data items S31, including the ordering data S21 in combination with the credit-card information 49, or to the data items S31, including the ordering data S21, the message digest 48 in combination with the credit-card information 49. The computer 30 sends the data items S31 with the created message digest 50 added thereto to the computer 10 in the form of an e-mail.

Upon this, the communications unit 11 of the computer 10 receives the data items S31 through the Internet N as a settlement-request message. In the case where the computer 10 is given the data items S31 with the message digest 50 added thereto, the determiner 14 receives the data items S31 and the message digest 50 from the communications unit 11, and then the payment determiner 12 receives the data items S31. In the case where the computer 10 receives only the data items S31 without the message digest 50, only the payment determiner 12 receives the data items S31.

The determiner 14 obtains a computation method which is confidential and used by the computer 30 for creating the message digest 50 in advance, and computes the input data items S31 using the obtained computation method. The same data as the value of the received message digest 50 should be obtained by computing the non-altered data items S31 based on the same computation method as that used by the computer 30. In this case, the determiner 14 compares a resultant value of the data items S31 with the value of the message digest 50. In the case where the resultant value of the data items S31 differs from the value of the message digest 50, the determiner 14 determines that the data items S31 might have possibly been altered, and informs the payment determiner 12 that the settlement can not effectively be made. On the contrary, in the case where the resultant value of the data items S31 coincides with the value of the message digest 50, the determiner 14 informs the payment determiner 12 that the settlement can effectively be made.

The above-described procedures are included in a determination process Sy1 shown in FIG. 5 and carried out by the determiner 14.

In the case where the data items S31 include the message digest 48, the determiner 14 obtains a computation method which is confidential and used for creating the message digest 48 in advance, and computes the input data items S31 using the obtained computation method, likewise the case of the message digest 50. Then, the determiner 14 may determine whether the ordering data items S31 have been altered.

Unless otherwise the determiner 14 instructs the payment determiner 12 not to make settlement, the payment determiner 12 carries out a payment determination process Sy2. The payment determiner 12 decodes the ordering data S21 received from the computer 30 and the credit-card information 49. Based on the decoded ordering data S21 and credit-card information 49, the payment determiner 12 determines whether to pay for goods or services ordered by the purchaser. A result of this determination made by the payment determiner 12 is given to the settlement-information creator 13. In the case where the payment determiner 12 denies paying for the purchased goods for some reason, the payment determiner 12 sends denying information about the denial of the payment determiner 12 to the computer 30. The settlement-information creator 13 and the adder 15 execute a settlement-information sending process Sy3, as will now specifically be described.

FIG. 8 is an explanatory diagram showing a settlement permit.

When the payment determiner 12 determines to pay for the purchaser, the settlement-information creator 13 creates a settlement permit representing about this determination, as shown in FIG. 6. This settlement permit includes the contents of the ordering data S21, and a permission number and expiration date of validity time which are included in settlement permission information 55.

In the case where the data sent from the computer 30 includes the message digest 48, the message digest 48 should be included in the settlement permit, so that the digest 48 can be checked by the computer 20.

The adder 15 computes, using a one-way function such as a Hush function, data items S11, which includes the contents of the ordering data S21, the settlement permission information 55, and a message digest 48 (if included). At the same time, the adder 15 generates a message digest 56 from the data items S11 in a shorter form than the data items S11. The adder 15 adds this message digest 56 to the data items S11, and sends the data items S11 with the message digest 56 attached thereto to the seller computer 20 through the communications unit 11 and the Internet N. At this time, the credit-card information 49 is not sent to the computer 20, thereby eliminating the possibility of leaking the purchaser's personal information.

The computer 20 obtains a computation method which is confidential and used by the computer 10 for creating the message digest 56 in advance, and computes the input data items S11 using the obtained computation method. The same data as the value of the received message digest 56 should be obtained by computing the non-altered data items S11 based on the same computation method as that used by the computer 10. In this case, the computer 20 compares a resultant value of the data items S11 with the value of the message digest 56. In the case where the resultant value of the data items S11 differs from the value of the message digest 56, the computer 20 determines that the data items S11 might have possibly been altered. At this time, the computer 20 sends an e-mail, etc. to the purchaser again, to instruct the purchaser to go through the above procedures again. On the contrary, in the case where the resultant value of the data items S11 coincides with the value of the message digest 56, the computer 20 presumes that the settlement can effectively be performed.

In the case where the data items S11 includes the message digest 48, the computer 20 computes, the ordering data S21 included in the data items S11, in accordance with the computation method used for creating the message digest 48. The computer 20 compares a resultant value of this computation with the value of the message digest 48.

In the case where the resultant value coincides with the value of the message digest 48, the computer 20 creates an order-reception table including information representing the order made by the purchaser.

On the contrary, in the case where the resultant value does not coincide with the value of the message digest 48, it can be considered that the ordering data S21 might have possibly been altered. In this case, the computer 20 determines that the settlement can not effectively be made, and does not create an order-reception table. The computer 20 sends an e-mail to the purchaser again to instruct the purchaser to go through the same procedures as the above.

FIG. 9 is an explanatory diagram showing an order-reception table.

The order-reception table includes data items S22, which includes the contents of the ordering data S21, the message digest 48, and an order number and delivery date as order-reception information 57. The data items S22 are sent to the computer 30 possessed by the purchaser. At this time, the computer 20 may compute the data items S22 in accordance with a one-way function, so that the computer 30 can check that the ordering data S21 or order-reception information 57 is not altered. In addition, the computer 20 generates the message digest 58 from the data items S22 in a shorter form than the data items S22. The computer 20 sends the data items S22 with the created message digest 58 added thereto to the computer 30 as an order-reception table. While sending the order-reception table, the seller goes through all the necessary procedures for delivering the ordered goods, so that the goods are delivered to the purchaser on the delivery date.

In the case where the message digest 58 is included in the order-reception table received from the computer 20 through the Internet, the computer 30 possessed by the purchaser acquires the computation method used for creating the message digest 58 in advance. Then, the computer 30 checks whether the data items S22 have not been altered, based on the acquired computation method. After it is checked that the data items S22 have not been altered, the computer 30 informs the purchaser of the delivery date and that the order has been received.

According to the electronic commerce system of this embodiment, the following advantages can be realized.

(1) Settlement can be made at every business transaction, before the ordered goods are provided to the purchaser. Hence, this reduces the inherent financial risk for the seller. Since the credit-card information 49 is not given to the computer 20, it is preventable that the seller makes bad use of the credit card. In addition, even in the case where the seller is bankrupted, the credit-card information is not spread out over the Internet, etc., and hence protecting the purchasers of the seller. Further, the settlement permission information of the settlement agency is sent directly to the seller, and hence there is no risk that such information is altered by the purchaser. That is, each of the purchaser, the seller and the settlement agency is given only information necessary for executing its corresponding process, thus there is almost no risk that the information is changed by someone having malice.

(2) Computer 20 or seller can determine for which ordering data S21 the settlement is made. Particularly, when sending the settlement permission information to the computer 20 in the settlement-information sending process Sy3, the data items S11 including the settlement permission information and the ordering data S21 are sent to the computer 20. By so doing, the computer 20 or the seller can understand which ordering data S21 has been used for settlement.

(3) Even if the ordering data S21 is altered, the computer 20 can finally check the alteration of the ordering data S21. This can be achieved by generating the ordering data S21 sent from the computer 30 to the computer 10, on the side of the computer 20.

(4) Communications contents between the computers 10, 20 and 30 are less likely to be given to the third persons on the Internet. This is because the data communications between the computers 10, and 30 are done using an encryption technique.

(5) Ordering data S21 sent to the computer 30 is stored in the computer 20, thereby easily understanding whether the sent data is altered.

(6) Even if the ordering data S21 having the message digest 48 attached thereto is altered, the computer 20 check the alteration. Specifically, the computer 20 creates the message digest 48 corresponding to the ordering data S21, and adds the created message digest 48 to the ordering data S21. Then, the ordering data S21 with the message digest 48 added thereto is returned back all way through the computers 30 and 10, thereby successfully checking the alteration of the ordering data S21. Even if the incorrect settlement is made by mistake, the seller does not have to deliver the products to the purchaser.

(7) Also computer 10 can determine whether the ordering data S21 is altered. Specifically, before the execution of the payment determination process Sy2, the computer 10 acquires a computation method used for creating the message digest 48 from the computer 20. The computer 10 compares the ordering data S21 with the message digest 48 using the acquired computation method, thereby determining the validity of the ordering data S21 and determining whether the ordering data S21 has been altered.

(8) Computer 10 can determine whether the ordering data S21 and the credit-card information 49 have been altered. Specifically, the computer 30 creates the message digest 50, adds the created message digest 50 to the ordering data S21 and credit-card information 49, and sends them to the computer 10, thereby the computer 10 can be aware of whether the ordering data S21 and the credit-card information 49 have been altered.

(9) Credit-card information 49 is highly secured. Specifically, when sending the credit-card information 49 and the ordering data S21 from the computer 30, the credit-card information 49 is encoded using an encryption method for sharing the credit-card information 49 with the computer 10, and hence protecting the credit-card information 49.

(10) Computer 20 can determine that the message digest 56, the settlement permission information 55 and the ordering data S21 have not been altered. Specifically, the computer 10 generates the third message digest 56 from the data items S11 including the settlement permission information 55 and the ordering data S21. Then, the computer 10 sends the message digest 56, the settlement permission information 55 and the ordering data S21 to the computer 20. Upon reception of the data from the computer 10, the computer 20 can be aware of that the message digest 56, the settlement permission information 55 and the ordering data S21 have not been altered.

(11) Unnecessary communications, such as calling-back, etc. are not required. The ordering data S31 and the credit-card information 49 which are necessary for settlement are sent to the purchaser or the purchaser computer 30. Hence, it is not necessary to give a call back to the computer 30.

Second Embodiment

In the above-described first embodiment, a program for adding the credit-card information 49 to the ordering data S21 in advance is installed in the computer 30 serving as a terminal to be used by the purchaser. According to such a technique, wherein the program provided by the settlement agency beforehand is installed in the computer 30, the settlement agency can provide each purchaser with an encryption key or a key for the message digest 50, using the installed program.

In the second embodiment of the present invention, explanations will now be made to the case where a program, for adding the credit-card information 49 to the ordering data S21, is installed every time ordering is made.

Figure 10:
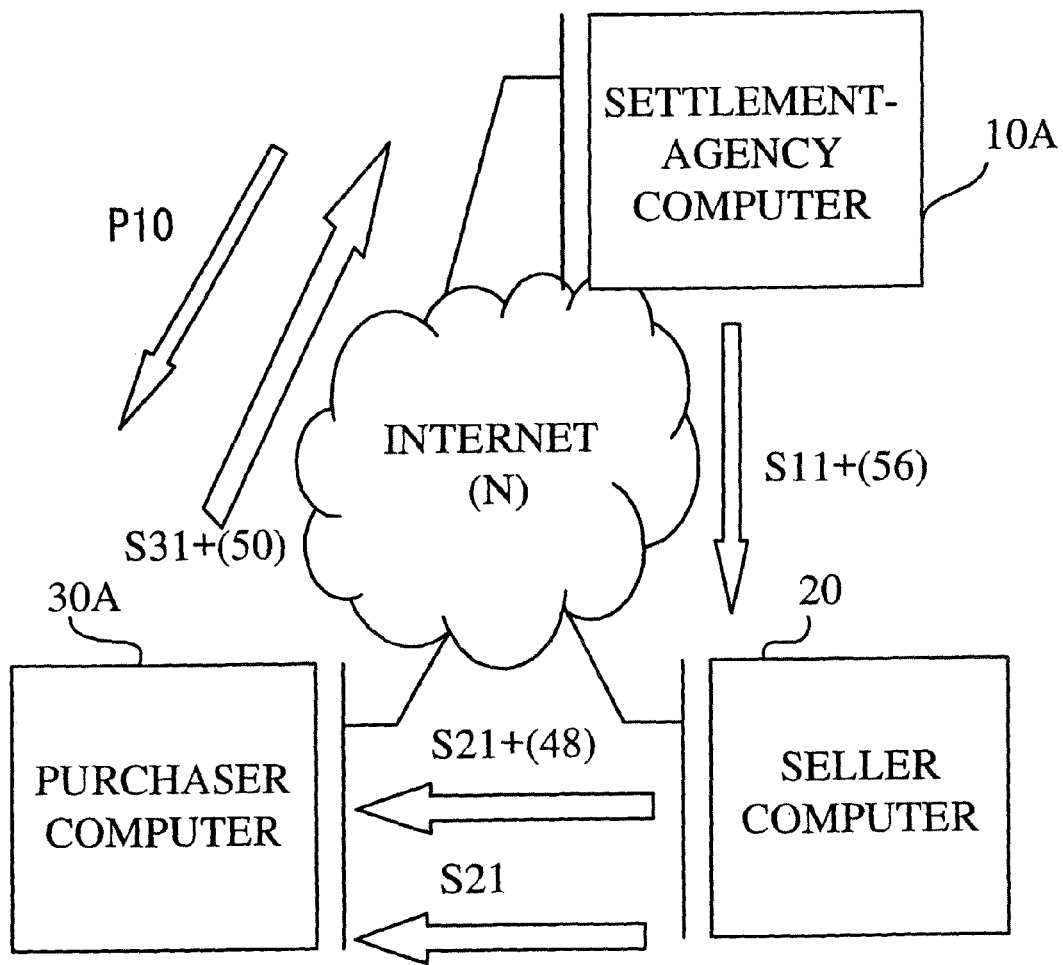
FIG. 10 is a block diagram showing the structure of an electronic commerce system according to the second embodiment of the present invention.

FIG. 10 is a block diagram showing the relationship among a payment agency, a seller and a purchaser, for carrying out an electronic commerce system according to the second embodiment of the present invention.

A computer 10A serving as an electronic commerce device and possessed by the settlement agency is connected to the computer 20 possessed by the seller providing goods or services, through the Internet N, so that data communications can be performed therebetween. The computer 10A is connected to a computer 30A possessed by the purchaser to be purchasing the goods or services, through the Internet, so that data communications can be performed therebetween. The computer 20 and the computer 30A are also connected through the Internet N, so that data communications can be performed therebetween as well.

Likewise the case of the first embodiment, the computer 20 has a function for sending the ordering data S21 to the computer 30A. The computer 10A has a function for sending a program P10 for adding the credit-card information 49 to the ordering data S21, to the computer 30A in response to a request form the computer 30A. The rest of functions of the computer 10A are the same as those of the computer 10 described in the first embodiment. The computer 30A can install the program P10.

Hereinafter, explanations will now be made to an electronic commerce system employing the computers 10A, 20 and 30A. In this embodiment, for the sake of easy description, the same reference numerals as those of FIGS. 2 to 9 in the first embodiment are used in this embodiment.

The seller provides a Web site on the Internet using the computer 20, and shows a list of goods or services to be sold. The purchaser, who intends to purchase goods or services using the Internet, access the computer 10A possessed by the payment agency using the computer 30A, every time ordering is made. Then, the computer 30A requests the computer 10A for the program P10 for adding the credit-card information 49 to the ordering data S21, which will be needed later.

The computer 10A provides the computer 30A, having requested the program, with the program. This program P10 includes procedures for adding the credit-card information 49 to the ordering data S21. In addition to this, the program P10 may include, for high security, an encoding technique with which the computer 30A generates a message digest from data items including the ordering data S21, and/or an encryption technique with which the computer 30A encrypts information to be sent to the computer 10A. In this embodiment, the encoding technique and the encryption technique are included in the program P10.

The purchaser who uses the computer 30A installs the program provided from the computer 10A into the computer 30A.

The purchaser who uses the computer 30A retrieves Web pages served on the Internet N using the computer 30A, and accesses a Web page of a seller which can provides the purchaser with goods or services through the Internet.

In accordance with instructions of the accessed Web page, the purchaser inputs necessary information using a keyboard, etc. as input means, likewise the case of the first embodiment. Specifically, the purchaser inputs the type of credit card used for deferred payment of the bill, together with business transaction information, including desired goods to be purchased, number of the goods to be purchased, purchaser address, purchaser name and phone number, etc. Then, the purchaser sends the input information to the seller computer 20. Thus sent information is a purchase-request message.

The computer 20 receives the purchase-request message from the computer 30A through the Internet, checks information representing the goods to be purchased and the number of the goods, checks the stock of the requested goods, and obtains the total amount of money to be paid for the goods. As shown in FIG. 6, the computer 20 creates the ordering data S21, representing the goods to be purchased 41, the number 42 of the goods, the address 43, the purchaser name 44, phone number 45, the calculated amount of money (to be paid) 46 and specification information 47 specifying the seller. Then, the computer 20 sends the created ordering data S21 to the computer 30A as an ordering message.

Since information flows over the Internet N, it is preferred that the ordering data S21 be transmitted in an encoded form so that the transmitted information can be protected from unauthorized access. When to create the ordering data S21, the computer 20 may compute the ordering data S21 using a one-way function such as Hush function, create a message digest 48 by encoding the ordering data S21 in a shorter form than the ordering data S21, add the created message digest 48 to the ordering data 21, and send the ordering data 21 with the message digest 48 added thereto to the computer 30S. The computer 20 stores the message digest 48 and the ordering data S21.

The computer 30A displays the ordering data S21 received from the computer 20 so as to show the data to the purchaser. If the ordering data S21 coincides with the purchaser request, the purchaser inputs the credit-card information 49 including the credit-card number 49a and password 49b, to the computer 30A using a keyboard, as shown in FIG. 7.

In accordance with the program P10 installed in the computer 30A before ordering is made, the computer 30A adds the credit-card information 49 to the ordering data S21, and creates data items S31. The computer 30 sends the created data items S31 to the computer 10A. While the data items, including the ordering data S21 with the message digest 48 attached thereto, are being received from the computer 20, the computer 30A generates the data items S31 including the ordering data S21 and the message digest 48 with the credit-card information 49 added thereto. Then, the computer 30A sends thus generated data items 31 to the computer 10A as a settlement-request message.

When transmitting the data items S31 including the credit-card information 49 onto the Internet, it is preferred that the information be encrypted so as to be protected from unauthorized access. On the assumption that the data items S31 will be altered before completely received by the computer 10, likewise the computer 20, the computer 30A can create a message digest 50 and add the created message digest 50 to the data items S31.

In the case where to add the message digest 50 to the data items S31, the computer 30A performs computation, using a one-way function such as a Hush function, for the data items S31 including the ordering data S21 in combination with the credit-card information 49 or for the data items S31 including the ordering data S21, the message digest 48 in combination with the credit-card information 49. Having done this computation, the computer 30A can create the message digest 50 by encoding the data items S31 in a shorter form than the data items S31. The computer 30A adds the created message digest 50 to the data items S31, including the ordering data S21 in combination with the credit-card information 49, or to the data items S31, including the ordering data S21, the message digest 48 in combination with the credit-card information 49. The computer 30A sends the data items S31 with the created message digest 50 added thereto to the computer 10. The computer 30A encrypts this information, in accordance with the encryption technique included in the program P10, and sends the encrypted information to the computer 10A.

Upon this, the communications unit 11 of the computer 10 receives the data items S31 through the Internet N as a settlement-request message.

The computer 10A decodes the information received from the computer 30A using a decoding technique corresponding to the encryption technique of the program P10. The decoded information includes the data items S31 and the message digest 50. The computer 10A encodes the data items S31 in a shorter form than the data items S31, using the same encoding technique as that included in the program P10. In the case where the encoded result does not coincide with the message digest 50, the data items S31 are very likely to have been altered. Thus, the computer 10A determines that the request for the settlement is not effective. On the contrary, in the case where the encoded result coincides with the message digest 50, the computer 10A determines that the request for the settlement is effective.

In the case where the data item S31 includes the message digest 48, the computer 10A acquires a computation method which is confidential and used for creating the message digest 48, in advance. Then, likewise the case of the message digest 50, the computer 10A may determine whether the data items S31 have been altered.

Unless otherwise it is determined that the request for settlement is not effective, the computer 10A determines whether the payment for the ordered goods or services are made for the purchaser, based on the ordering data S21 and the credit-card information 49 so as to create the same settlement permit as that shown in FIG. 6. In the case where the computer 10A denies paying for the ordered goods or services for some reason, it sends denial information about the denial to the computer 30A.

The settlement permit includes the contents of the ordering data S21, and a permission number and expiration date of validity time includes in the settlement-permission information 55. In the case where the data sent from the computer 30A includes the message digest 48, the message digest 48 is shown in the settlement permit, so that the computer 20 can check whether there is the digest in the sent data.

The computer 10A computes, using a function such as a Hush function, data items S11, including the contents of the ordering data S21, the payment permission information 55 including the permission number and the expiration date, and the message digest 48 (if included). At the same time, the computer 10A generates the message digest 56 from the data items S11 in a shorter form than the data items S1, adds the created message digest 56 to the data items S11, and sends the data items S11 with the message digest 56 added thereto to the computer 20. At this time, the credit-card information 49 is not given to the computer 20 and hence the personal information of the purchaser is protected.

Upon reception of the data items S11 and the message digest 56, the computer 20 carries out the same procedures as those done by the computer 20 described in the first embodiment.

Accordingly, using the electronic commerce system of this embodiment, the program P10 is given and installed into the computer 30A from the computer 10A, every time the order or settlement is made. If the encoding technique or encryption technique for creating the message digest 50 is incorporated into the program P10, it is not necessary to take the trouble to acquire the encoding technique or encryption technique. In addition, the encoding technique or encryption technique can be changed for each order. Therefore, the settlement can be achieved more securely in accordance with the electronic commerce system according to the second embodiment, than the case of the first embodiment.

Third Embodiment

In the second embodiment, to add the credit-card information 49 to the ordering data S21 sent from the computer 20, the program P10 is sent from the computer 30a from the computer 10A and installed into the computer 30A.

In this embodiment, explanations will now be made to an electronic commerce system for adding the credit-card information 49 to the ordering data S21 using an IC card.

Figure 11:
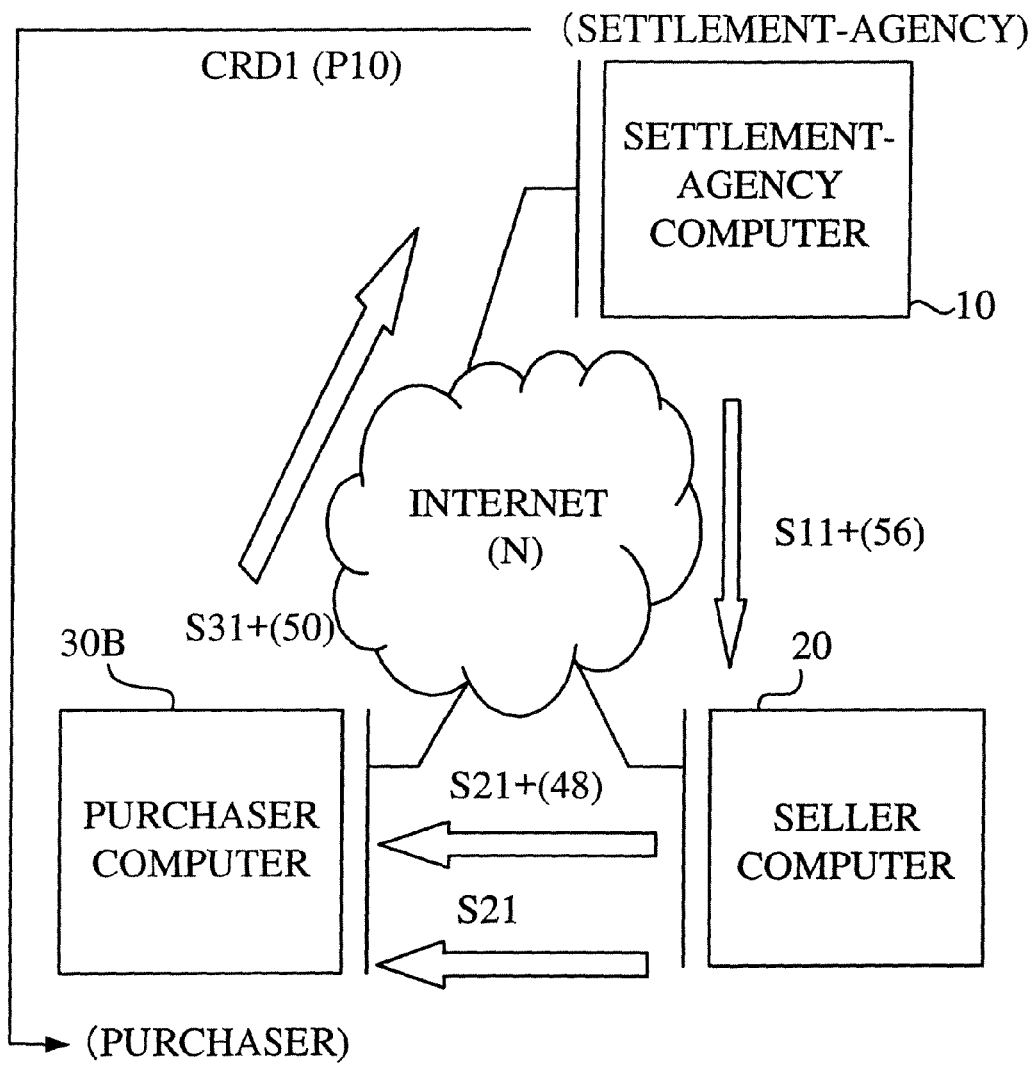
FIG. 11 is a block diagram showing the structure of an electronic commerce system according to the third embodiment of the present invention.

FIG. 11 is a block diagram showing the relationship among a settlement agency, a seller and a purchaser, for carrying out an electronic commerce according to the third embodiment of the present invention.

The computer 10 and the computer 20 are the same as those described in the first embodiment, and are connected with each other through the Internet N, so that data communications can be performed therebetween. The computers 10 and 20 may be connected using a private line, public line, etc.

The computer 10 is connected to a computer 30B, serving as a purchaser terminal used by the purchaser of goods or services, through the Internet N, so that data communications can be performed therebetween. The computers 20 and 30B are connected with each other through the Internet N, so that data communications can be performed therebetween also. The computers 10 and 30B may be connected via a private line or public line. The computers 20 and 30B may also be connected with each other through a private line or public line. A non-illustrative reader/writer, for reading information on an IC card CRD1, is installed or incorporated in the computer 30B.

The program P10 for adding the credit-card information 49 is written on the IC card CRD1 by the settlement agency, and the IC card CRD1 is distributed to purchasers beforehand. Likewise the second embodiment, this program P10 may include procedures for the computer 30B to add the credit-card information 49 to the ordering data S21. In addition, this program P10 may include an encoding technique for the computer 30B to generate a message digest from the data items including the ordering data S21 and/or an encryption technique for the computer 30B to encrypt information to be sent to the computer 10. Such an encoding technique and/or an encryption technique are prepared for high security sake, and are incorporated in the program P10 in this embodiment.

In the electronic commerce system using the computers 10, and 30b, the IC card CRD1 is given to the purchaser in advance. The purchaser sets the IC card CRD1 to the reader/writer of the computer 30B, and the program P10 is given and installed to and in the computer 30B.

In accordance with the program P10, the computer 30B having the program P10 installed therein adds the credit-card information 49 to the ordering data S21 sent from the computer 20, so as to create data items S31. The computer 30B encode the data items S31 using the encoding technique included in the program P10, so as to create the message digest 50. In this case, the data items S31 may include the ordering data S21 and the credit-card information 49, with or without the message digest 48.

Subsequently, the computer 30B encrypts the information, including the message digest 50 in combination with the data items S31, using the encryption technique included in the program P10, and sends the encrypted information to the computer 10.

The procedures which are executed by the computers 10 and 20 are the same as those described in the first and second embodiments, and will not specifically be described in this embodiment.

In the third embodiment, the reader/writer is installed or included in the computer 30B, and the program P10 is provided from the IC card CRD 1 to the computer 30B. Thus, unlike the second embodiment, it is not necessary to send the program P10 from the computer 10A to the computer 30B. In this structure, it is unlikely that the purchaser will improperly install the program P10 in the computer 30B. In addition, the encoding technique or encryption technique are included in the program P10, thereby realizing a high level of security.

Fourth Embodiment

In the above-described third embodiment, the credit-card information 49, including the credit card number 49a and password 49b, is input into the computer 30 using a keyboard as input means. In this embodiment, explanations will be made to another input means for inputting the credit-card information 49 into the computer 30 described in the first embodiment.

In place of the sender 20b, recording means for writing data on a recording medium is prepared in the computer 20 of FIG. 3, so that the settlement agency can write personal information on the recording medium and provide the purchaser with the recording medium with the information written thereon. The recording medium may be a magnetic card, a magnetic disk, a compact disk or the like. According to this method, the recording medium is set in the recorder of the computer 30, thereby inputting the personal information into the computer 30. Further, the personal information input into the computer 30 is included in the settlement-request message.

In the case where a reader/writer for inputting information from an IC card in the computer 30, personal information may be written onto an IC card, and the IC card with the personal information written thereon is provided to the purchaser. According to this method, the IC card is set into the reader of the computer 30, thereby encrypting the personal information and input into the computer 30. According to this structure wherein the encrypted personal information is input into the computer 30, the personal information can highly be protected from authorized access. Then, the personal information input into the computer 30 is reliably included into the settlement-request message.

In the case where the personal information is input from the recording medium or IC card, it is necessary to check whether the user having input the personal information is one who possesses the recording medium or IC card. That is, in the above case, it is necessary to perform a user authentication process.

Upon reception of the settlement-request message from the computer 30, the computer 10 provides the purchaser with the received message through the computer 30, and instructs the purchaser to input a password, etc. using a keyboard. The password is sent from the purchaser from the computer 30, thereby executing the user authentication process. In the case where the transmitted password is proper, it is determined whether the settlement can be performed for the purchaser. In the case where the transmitted password is not proper, it is determined that the payment for the goods or services corresponding to the ordering data S21 can not be performed for the purchaser.

If the computer 30 includes inputting means for obtaining images of fingerprints or pupils, for example, the images of fingerprints or pupils may be input to the computer using the inputting means. The fingerprints or pupils can be body information for identifying people. The computer 10 can perform user authentication, using the fingerprints or pupils received from the computer 30.

As described above, according to the fourth embodiment of the present invention, the personal information written on the recording medium or IC card is input into the computer 30. In the case where the personal information is input through the keyboard, only a small amount of personal information can be input, because the inputting error may sometimes occur. However, in the case where the personal information is input from the recording medium or IC card, a large amount of personal information can be input, and reliable electronic commerce can be realized.

Fifth Embodiment

Figure 12:
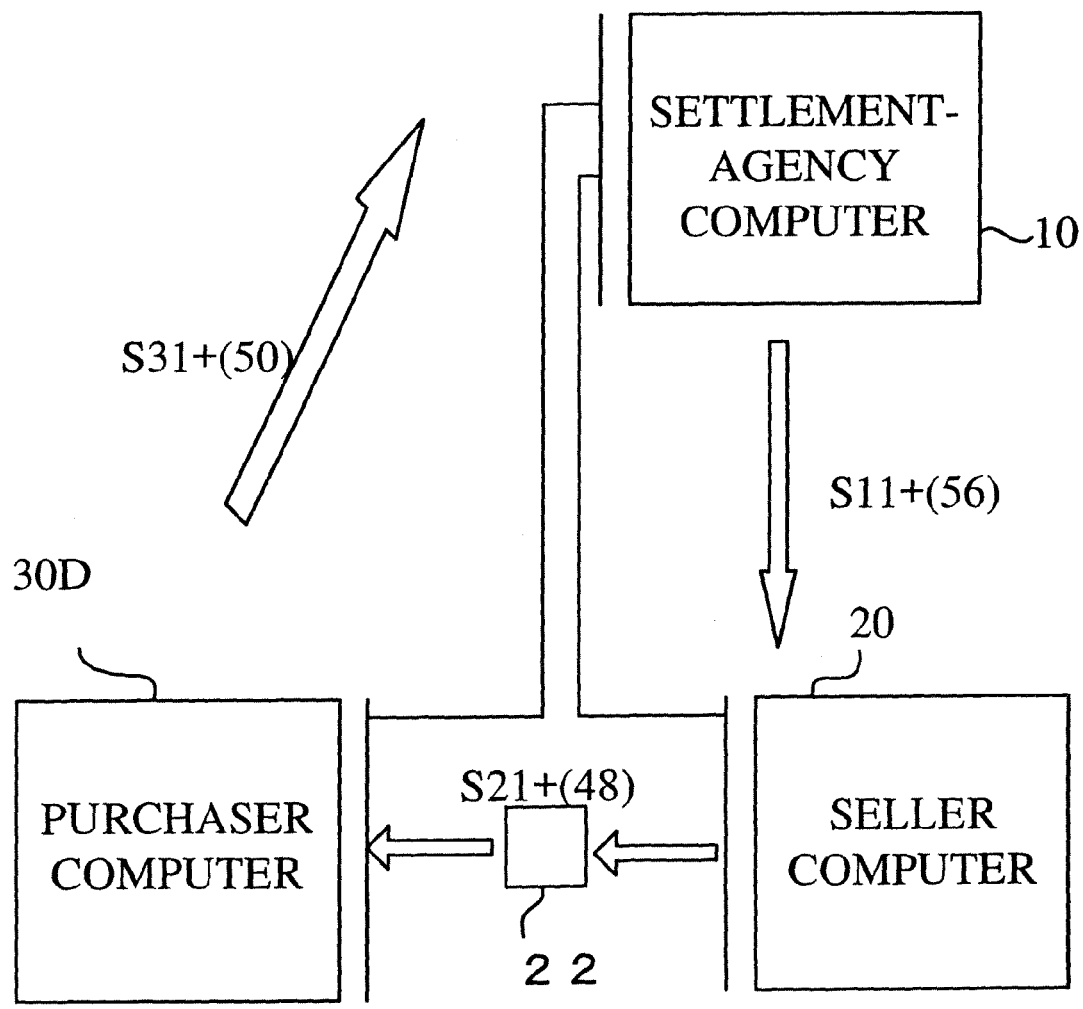
FIG. 12 is a block diagram showing the structure of an electronic commerce system according to the fourth embodiment of the present invention.

FIG. 12 is a block diagram showing the relationship among a settlement agency, a seller and a purchaser, for carrying out an electronic commerce system according to the fifth embodiment of the present invention.

In the above-described first to fourth embodiments, the explanations have been made to the case where the computers 30, 30A and 30B which are used by the purchaser are his/her possessions and are kept away from the seller computer 20. However, the terminal used by the purchaser may be installed in the seller's store or office, etc. In this case, an unspecified number of the general purchasers can share the terminal. In FIG. 12, a computer 30D to be used by the purchaser is installed in a store, etc. of the seller.

The computer 30D is connected to the computer 10 used by the settlement agency, through a private line, etc. The computer 20 used by the seller is connected to the computer 10 through a private line. The computer 10 is the same as that described in the first embodiment. The computer 20 is the same as that described in the first embodiment, and additionally includes a non-illustrative writing unit for writing data on a recording medium, as will be described in more detail later. The computer 30D has a non-illustrative reader for reading data from the recording medium.

If the purchaser wants to get goods or services from the seller's store, he/she informs the seller of the kind of his/her credit card for deferred payment, together with required information items representing the target goods, the number of the goods, the purchaser address, name and phone number, etc. After this, the seller inputs the input information into the computer.

Of the input information items, the information items representing the target goods to be purchased and the number of the goods to be purchased are checked by the computer 20. After this, the computer 20 checks the stock of the goods, and calculates the price of the goods in total. Likewise the first embodiment, the computer 20 creates ordering data S21 by adding the price 46 and information 47 specifying the seller itself and issued from a credit-card issuer, to the required information, representing the goods to be purchased 41, the number 42 of the goods to be purchased, the purchaser address 43, the purchaser name 44 and phone number 45. Then, the computer 20 records the created ordering data S21 on the recording medium 22 as an ordering message. The recording medium 22 may be a floppy disk on which information is generally recorded by a computer, a magnetic card, an IC card, etc. The recording medium 22 on which the ordering data S21 is written is provided to the purchaser.

When creating (computing) the ordering data S21, the computer 20 may use a one-way function such as a Hush function, for example, create the message digest 48 by encoding the ordering data S21 in a shorter form than the ordering data S21, add the created message digest 48 to the ordering data S21, and write the ordering data S21 with the message digest 48 added thereto onto the recording medium 22.

According to these procedures, the seller can know whether the contents of the ordering data S21 has been altered afterwards, by performing the same computation for corresponding ordering data S21. Therefore, it is preventable that data is used or altered by any unauthorized access in malice.

The purchaser controls the computer 30D to read the ordering data S21 written on the recording medium 22 and to input, into the computer 301), the credit-card information 49 including the personal information 49*a* or password 49*b*. The computer 30D having read the ordering data S21 operates in the same manner as that of the computer 30 described in the first embodiment, adds the credit-card information 49 to the ordering data S21, and provides the computer 10 with the ordering data S21 with the credit-card information 49 added thereto.

When to input the credit-card information 49 into the computer 30D, there can be employed an IC card for encrypting and reading the credit-card information 49. In this case, the personal information of the purchaser can remarkably be prevented from being given to the third parties, even in the case where the computer 30D itself is a target computer which sends/receives information to be wiretapped. The personal information input into the computer 30D is included in the settlement-request message.

The computer 10 operates in the same manner as that described in the first embodiment, and provides the computer 30D with the settlement permission information, while the credit-card information 49 is not given to the computer 30D. Then, in this structure, the electronic commerce can be realized.

As described above, according to the electronic commerce system according to the fifth embodiment of the present invention, the computer 30D is installed in a store. Hence, an unspecified number of the general purchasers can share the computer 30D. Further, the ordering data S21 is provided from the recording medium to the computer 30D, so that the ordering data S21 can not be wiretapped by the third parties.

Sixth Embodiment

Figure 13:
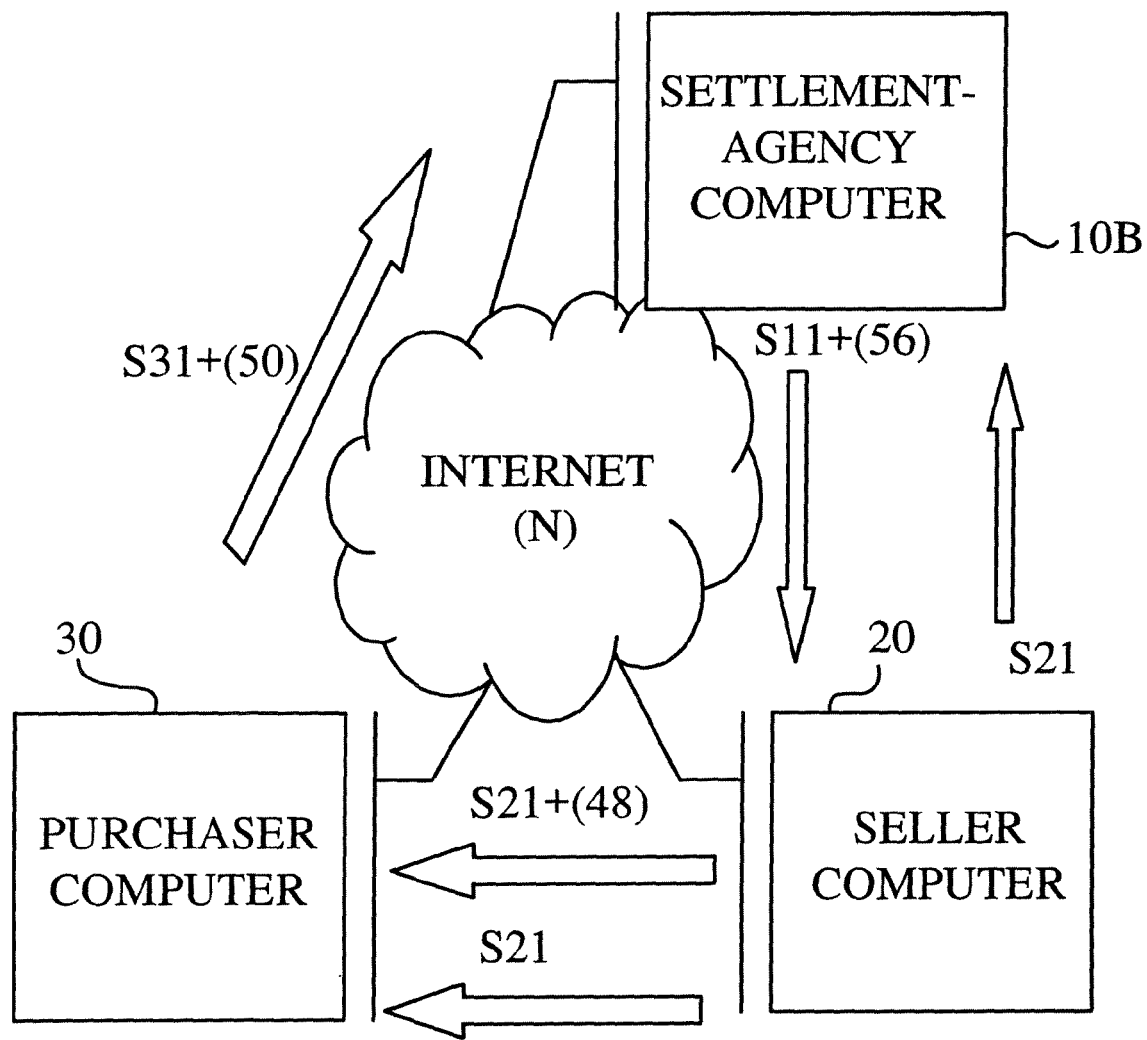
FIG. 13 is a block diagram showing the structure of an electronic commerce system according to the fifth embodiment of the present invention.

FIG. 13 is a block diagram showing the relationship among a settlement agency, a seller and a purchaser, for carrying out an electronic commerce system according to the sixth embodiment of the present invention.

In this embodiment, the ordering data S21 created by the computer 20 is provided from the computer 20 to a computer 10B. The computer 10B compares the provided ordering data S21 with ordering data S21 provided through the computer 30, thereby determining whether the provided ordering data S21 has been altered.

Figure 14:
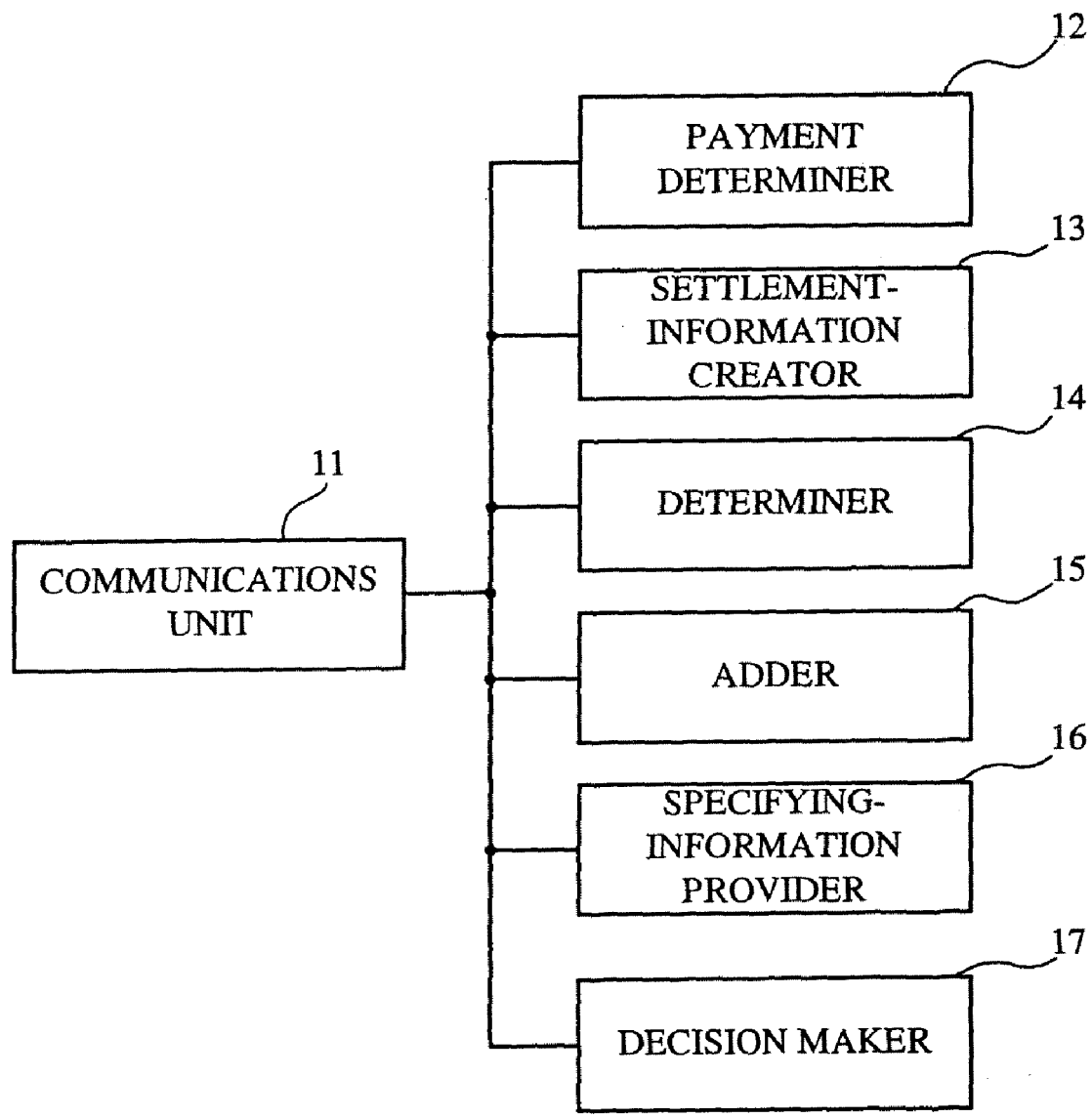
FIG. 14 is a diagram exemplarily showing the structure of a computer 10B shown in FIG. 11.

FIG. 14 is a diagram exemplarily showing the structure of the computer 10B shown in FIG. 13.

The computer 10B operates under the control of a program, and includes the communications unit 11, the payment determiner 12, the settlement-information creator 13, the determiner 14 and the adder 15 which are included in the computer 10 of the first embodiment. Additionally, the computer 10B includes a specifying-information provider 16 and a decision maker 17.

When the ordering data S21 is provided from the computer 20, the specifying-information provider 16 creates specifying information specifying a unique combination of the ordering data S21 and its related seller, and sends the created specifying information to the computer 20. The decision maker 17 compares the ordering data S21 provided from the computer 20 with the ordering data S21 provided from the computer 30. Then, the decision maker 17 determines whether the ordering data S21 from the computer 30 has been altered.

Figure 15:
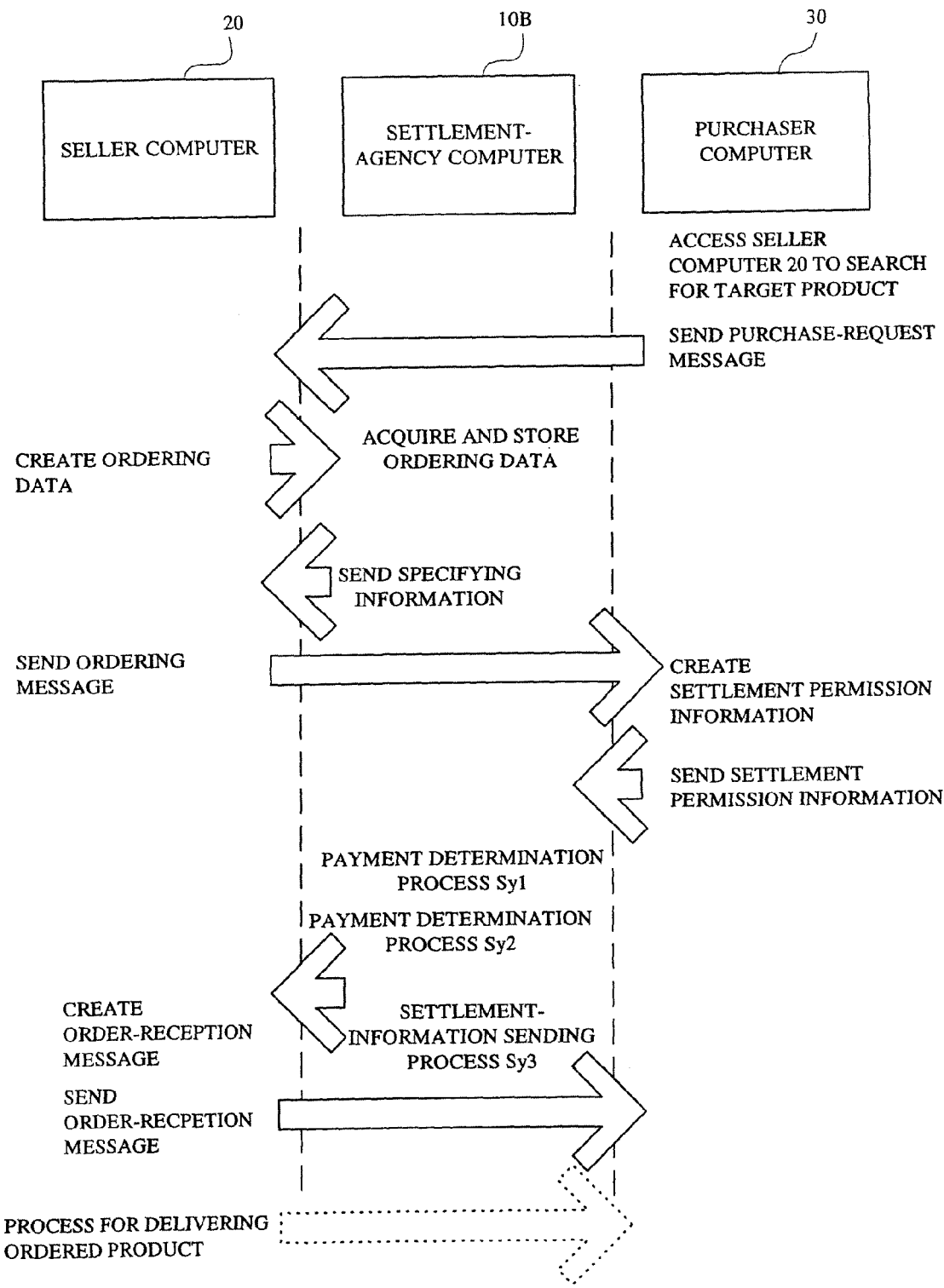
FIG. 15 is a flowchart for explaining procedures to be performed by computers 10A, 20 and 30.

FIG. 15 is a flowchart for explaining procedures which are performed by the computers 10A, 20 and 30. Explanations will now be made to an electronic commerce system employing a credit card, with reference to FIG. 15.

The seller sets a Web page on the Internet N using the computer 20, and shows a list of goods or services to be provided. The purchaser accesses the Web site. In the case where the purchaser wants to purchase some goods or services through the Web site, the purchaser operates the computer 30 to input information regarding his/her credit card for deferred payment, together with required information representing the goods to be purchased, the number of the goods, the purchaser address, the purchaser name and the purchaser's phone number, in accordance with instructions shown on the Web site. Then, the computer 30 sends the input information to the computer 20. This sent message is a purchase-request message.

The computer 20 checks the information representing the goods to be purchased and the number of the goods, which is sent from the computer 30, checks the stock of the goods, and calculates the price of the goods in total. After this, the computer 20 creates the ordering data S21, by adding the calculated price 46 and information 47 specifying the seller itself and specified by a credit-card issuer, to the required information representing the goods 41 to be purchased, the number 42, the purchaser address 43, the purchaser name 44 and the purchaser phone number 45, etc. Then, the computer 20 sends the created ordering data S21 to the computer 10.

The decision maker 17 receives the ordering data S21 from the computer 20. The specifying-information provider 16 creates specifying information for specifying a unique combination of the ordering data S21 and its corresponding seller, and sends the created specifying information to the computer 20 through the communications unit 11, and hence facilitating managing of the settlement.

Upon reception of the specifying information from the computer 10, the computer 20 replaces the information 47 specifying the seller and included in the ordering data S21, with the specifying information provided from the computer 10. Then, the computer 20 sends the replaced ordering data S21 to the computer 30.

Since information flows over the Internet, it is preferred that the ordering data S21 be encrypted and flow, so that the ordering data S21 can be protected from unauthorized access.

Likewise the first embodiment, the computer 30 shows ordering data S21 provided from the computer 20, to the purchaser. Then, the purchaser can determine whether the ordering data S21 corresponds to his/her request. In the case where it is determined that the ordering data S21 corresponds to the purchaser request, the purchaser inputs the credit-card information 49 including the credit-card number 49a and password 49b, as personal information, through the computer 30, thereby creating the data items S31 including the ordering data S21 with the credit-cart information 49 added thereto. Then, the computer 30 sends thus created data items S31 as a settlement-request message to the computer. At this time, it is preferred that the information items to be sent are encrypted so as to be protected from being spread over the Internet, etc.

The computer 30 generates the message digest 50 from the data items S31 in a shorter form than the data items S31, by computing the data items S31 including the ordering data S21 and the credit-card information 49 using a one-way function such as a Hush function. Then, the computer 30 adds the generated message digest 50 to the data items S31 to the computer 10 of the settlement agency.

The data items S31 are received by the communications unit 11 of the computer 10. Then, the decision maker 17 receives the ordering data S21 included in the sent data items S31. The decision maker 17 compares the ordering data S21 sent from the computer 20 with the ordering data S21 included in the data items S31, to determine whether the ordering data S21 included in the data items S31 have been altered, and informs the payment determiner 12 of the comparison result.

The payment determiner 12 receives the data items S31.

In the case where it is determined that the ordering data S21 have not been altered, the payment determiner 12 carries out the payment determination process Sy2. In the payment determination process Sy2, the payment determiner 12 determines whether to pay for the goods or services ordered by the purchaser, based on the credit-card information 49 and ordering data S21 received from the computer 30.

The result of the payment determination process Sy2 is sent to the settlement-information creator 13. In the case where it is denied to make the payment for some reason, the payment determiner 12 sends denying information representing the denial of payment to the computer 30. The settlement-information creator 13 and the adder 15 carry out the same settlement-information sending process Sy3 as that described in the first embodiment, and create data items S11, including the contents of the ordering data S21 and settlement permission information 55 having the permission number and expiration date of validity time. After this, the settlement-information creator 13 and the adder 15 send the created data items S11 to the computer 20, while the credit-cart information 49 is kept secret from the seller.

Accordingly, the electronic commerce can be realized without informing the seller of the credit-card information 49.

According to the electronic commerce system of this embodiment, the computer 10B compares the ordering data sent from the computer 20 with the ordering data sent form the computer 30, in order to detect whether the target ordering data has been altered, and hence improving the reliability of the settlement of the charge. The specifying information specifying a corresponding seller is created and sent to the computer 20, and hence facilitating the management of the electronic commerce. The sending of the ordering data S21 to the computer 10 results in requesting the specifying information. Even in the above electronic commerce system, extra data communications are not necessary.

The present invention is not limited to the above, and various changes or modifications can be made without departing from the broad spirit and scope of the invention. The followings are the modifications of the present invention.

(a) In the above embodiments, the computer 20 provides a Web site on the Internet N, and the purchaser accesses the Web page through the computer 30. However, the purchaser can order some goods to be purchased through an e-mail without accessing the Web page.

(b) In the above embodiments, the message digests 48, 50, 56 and 58 which have highly been encoded using a one-way function such as a Hush function are employed in order to check whether target data has been altered. However, if there is any technique for forming the data in a shorter form than its original form, the technique may be employed.

(c) The present invention can be adapted not only to the deferred payment using the credit card, but also an electronic commerce system of settling the charge using a credit card or debit card, etc.

(d) The computers 10 and 20 may be connected with each other through a private line. The computers 10 and 30 may also be connected with each other through a private line. According to this structure wherein the computers 10, 20 and 30 are connected with each other through a private line, the communication data to be transmitted therebetween can highly be protected from being wiretapped.

(e) In the second embodiment, the computer 10A provides the computer 30A with the program P10, and the program P10 is installed in the computer 30A. However, the computer 20 may provides the computer 30A with the program P10, and the program P10 may be installed in the computer 30A. Even in this case, the encoding technique for creating the message digest 50 and/or the encrypting technique for encrypting the information to be sent to the computer 10A may be included in the provided program P10. In this case, it is not necessary that the computer 30A acquire the encoding technique and encrypting technique from the computer 20, while keeping the techniques not available to the third party. Further, different encoding techniques and encrypting techniques can be used by different purchasers, and hence realizing reliable electronic commerce system.

(f) In the above-described first to sixth embodiments, the ordering data S21 has been treated by the computer 20. However, as long as the reliability of the ordering data S21 can be ensured, the ordering data S21 can be created by the computer 30.

Seventh Embodiment

Explanations will now be made to an electronic commerce system according to the seventh embodiment of the present invention, referring to three different examples of the structure of the system.

First Example of Seventh Embodiment

Figure 16:
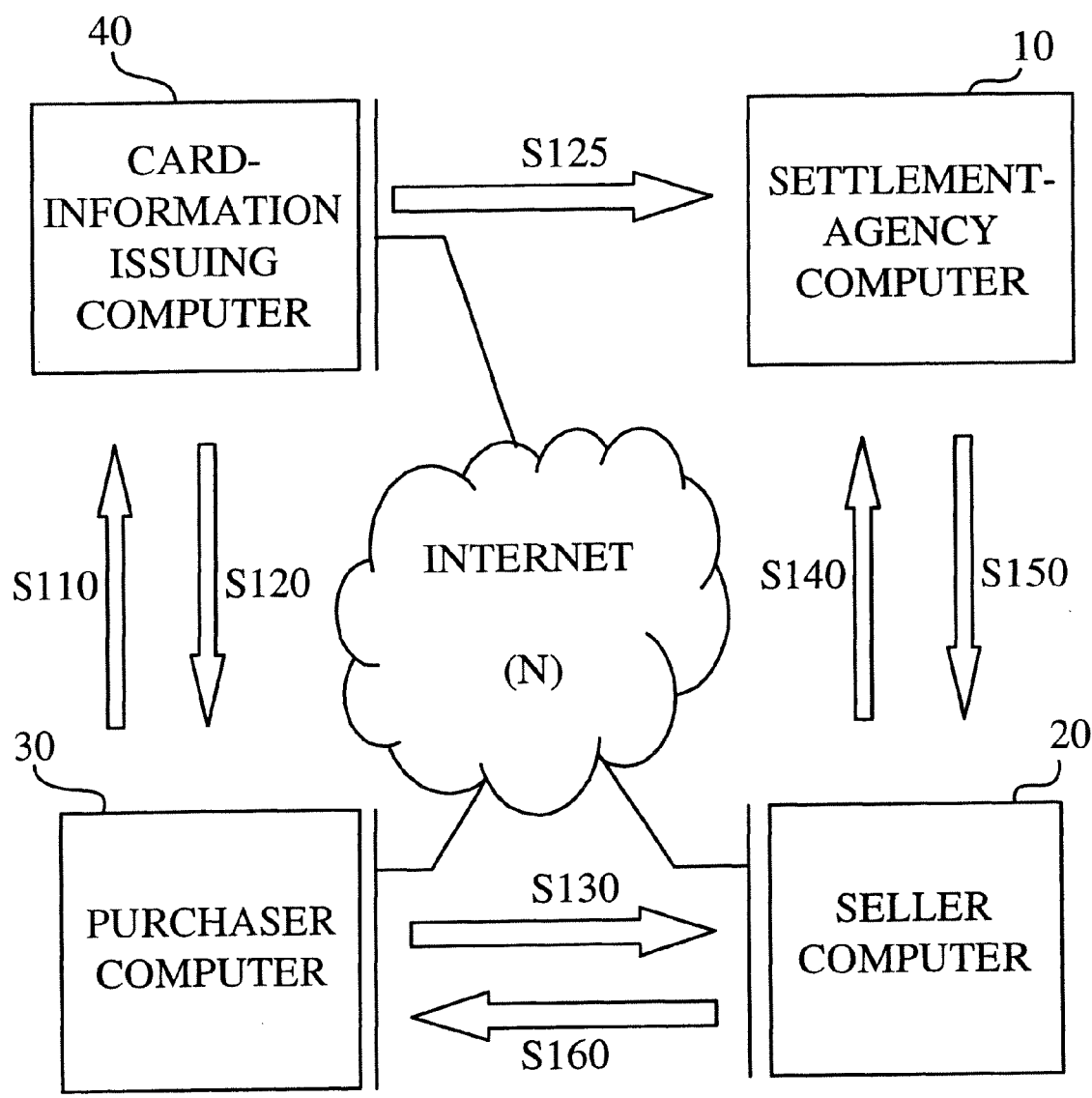
FIG. 16 is a diagram showing a typical electronic commerce system according to the first example of the seventh embodiment of the present invention.

FIG. 16 is a diagram showing the typical electronic commerce system according to the first example of the seventh embodiment. As shown in FIG. 16, the electronic commerce system of the first example of the seventh embodiment further includes a card-information issuing computer 40, in addition to the structure shown in FIG. 1. The computer 10 possessed by the settlement agency is connected to the card-information issuing computer 40 and the computer 20, through relatively a secure line (hereinafter referred to as a secure line), such as a private line, a public line, etc., instead of tee Internet N.

The card-information issuing computer 40 is possessed by a card issuer which may or may not be the settlement agency. Each of the computer 20, the settlement agency 10 and the card-information issuing computer 40 may include simply a single computer or a plurality of computers.

The computer 40 may have a structure substantially equal to that shown in FIG. 4. In this case, the processor 30a receives data from the purchaser computer 30 through the input unit 30b, performs necessary process for issuing one-time-credit-card information, and send data to the purchaser computer 30 and settlement-agency computer 10 through the output unit 30c.

The computer 30 sends a request message, for requesting the card-information issuing computer 40 to issue credit-card information (one-time (discardable) information regarding the deferred payment), to the card-information issuing computer 40 through the Internet N (Step S110). In response to this request, the card-information issuing computer 40 sends a one-time-information message including the one-time credit-card information to the computer 30 through the Internet (Step S120). The card-information issuing computer 40 sends association information for setting the one-time credit-card information sent to the computer 30 in association with the actual credit-card information, to the computer 10 through a secure line (Step S125).

The computer 30 sends an ordering message, including an order table and one-time credit-card information sent form the card-information issuing computer 40, to the computer 20 through the Internet (Step S130). The computer 20 sends an examination request, including the one-time credit-card information sent from the computer 30 and the order table, to the settlement agency 10 through a secure line, so as to ask for settlement (Step S140).

The computer 10 receive the actual credit-card information from the one-time credit-card information sent from the computer 20. Then, the computer 10 determines whether payment can be made for the goods ordered by the purchaser, based on the credit-card information and the order table. The computer 10 sends a result of this determination (yes/no message) to the computer 20 through a secure line (Step S150). Upon reception of the determination result from the computer 10, the computer 20 sends the received determination result to the computer 30 (sends an order-reception message or an "unsuccess" message) to the computer 30 through the Internet. In the case of the order-reception message, i.e. it is determined that the payment can be made, the computer 20 carries out a delivery process for delivering the ordered goods.

In the above structure, the seller may include a seller handling private business.

Operations of the first example of the seventh embodiment will now specifically be described with reference to FIG. 17.

The purchaser inputs information, such as his/her credit-card information, for specifying him/herself, using the computer 30, and creates a request message for requesting one-time credit-card information, including the input information (Step B11). The computer 30 sends the created request message to the computer 40 through the Internet N (B12 to I11). Note that the request message for requesting one-time credit-card information includes credit-card information (a credit card number, a password and expiration date of validity time if necessary) requested by the computer 40.

The computer 40 examines the information specifying the purchaser and sent from the computer 30. In the case where the specifying information represents a proper purchaser, the computer 40 generates one-time credit-card information. Further, the computer 40 creates a credit-card information message including the generated one-time credit-card information (Step I12). The computer 40 sends this credit-card information message to the computer 30 (Step I13). Further, the computer 40 creates corresponding data, representing the credit-card information of the purchaser and the one-time credit-card information in association with each other, and creates a corresponding message (Step I14).

The computer 40 sends the created corresponding message to the computer 10 through a secure line (Step I15).

Upon reception of the corresponding message from the computer 40, the computer 10 registers the corresponding message in a table (hereinafter referred to as a corresponding table), so that the one-time credit-card information corresponds to the credit-card information (hereinafter referred to as actual credit-card information) of the purchaser (Step P12). This correspondence table is created in the form of a file or database, etc. In the case where the correspondence table is created in the form of a relational database, the correspondence between the one-time credit-card information and the actual credit-card information can be realized by storing the actual credit-card information and the credit-card information in the same record.

The computer 30 creates an order message by gathering information representing the goods ordered by the purchaser, the number of the goods to be purchased and information (order table) requested by the seller, in addition to the one-time credit-card information sent form the computer 40 (Step B14). Then, the computer 30 sends the created order message to the computer 20 through the Internet (Step B15).

The computer 20 receives this order message from the computer 30 (Step M1). The computer 20 creates an examination-request message including the one-time credit card information and any other information requested by the credit card company for examining the purchaser, based on the contents of the order table included in the order message (Step M12). The computer 20 sends the created examination-request message to the computer 10 through a secure line (Step M13).

The computer 10 searches the correspondence table updated in the step P12, based on the one-time credit-card information included in the sent examination-request message. Then, the computer 10 acquires the actual credit-card information corresponding to the received one-time credit-card information.

The determination as to whether the purchaser is a proper purchaser can be done using the actual credit-card information and other information sent from the computer 20. Further, the computer 10 creates a message (hereinafter referred to as an yes/no message) representing whether the payment can be made for the purchaser, and discards the corresponding data of the one-time credit-card information and the actual credit-card information. In this case, the one-time credit-card information is discarded (Step P14). After this, the computer 10 sends this yes/no message to the computer 20 through a secure line (Step P15).

The computer 20 receives a yes/no message representing whether the payment can be made for the purchaser (Step M14).

The computer 20 creates a message (an order-reception message or an "unsuccess" message) based on the determination result sent from the computer 10 (Step M15). In the case where it is examined that the payment can be made for the purchaser, the computer 20 informs the computer 30 that the order has successfully been received, through the Internet N, and ends an order-reception message for informing the computer 30 about the order contents (Step M16-B16). Then, the computer 20 carries out a delivery process for actually delivering the ordered goods (M17, M18-B17).

On the contrary, in the case where it is determined that the payment can not be made for the purchaser, the computer 20 informs the computer 30 of that (M16-B16).

In this example, the credit card is employed. However, the present invention can be adapted to any other deferred payment method, employing a cash card, a debit card, etc.

Figure 17:
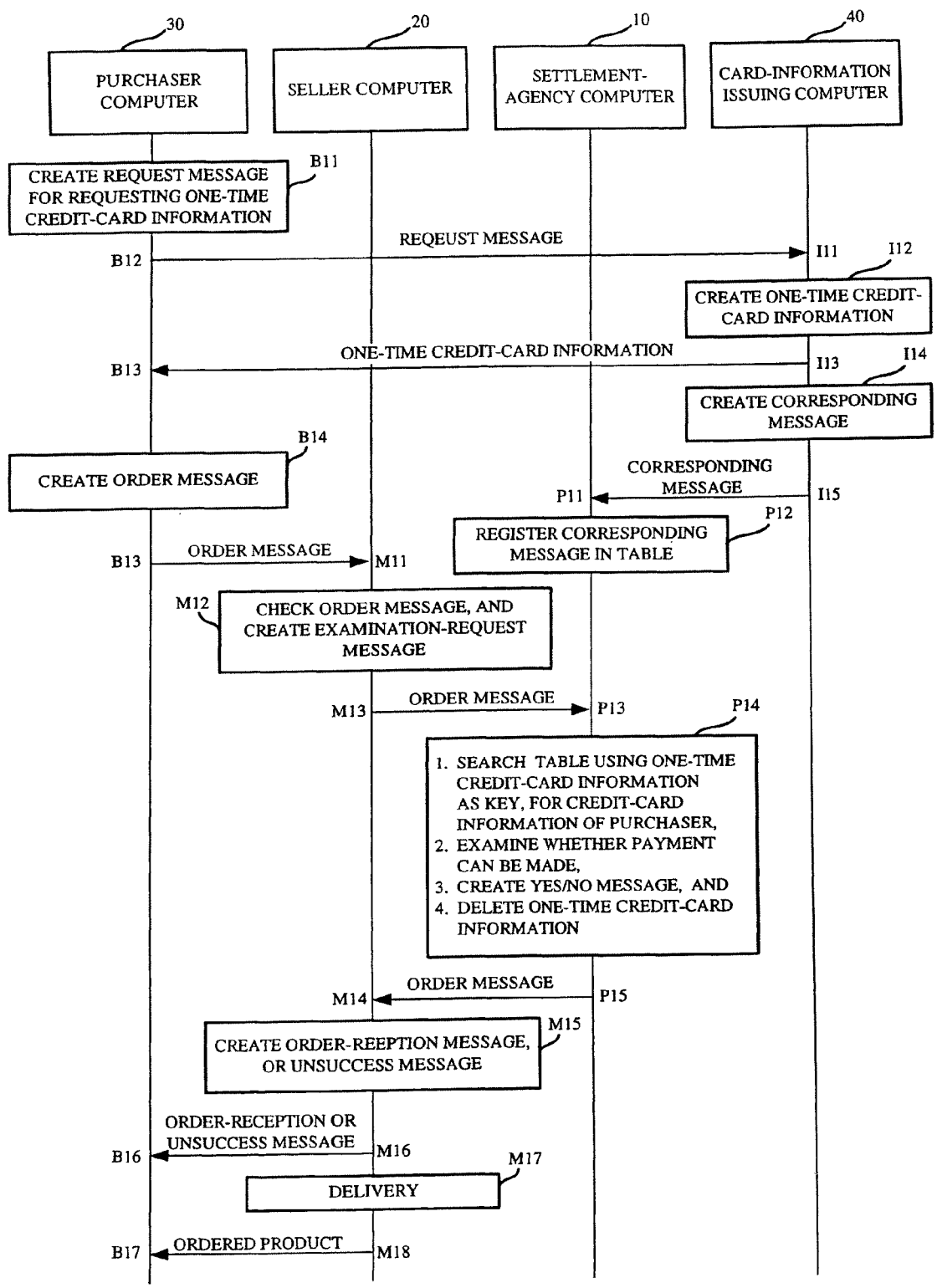
FIG. 17 is a flowchart for explaining an electronic commerce process, which is carried out among a seller computer, a purchaser computer, a settlement agency computer and a card-information issuing computer, which are included in the electronic commerce system of FIG. 16.

In the operations shown in FIG. 17, when sending information through the Internet, it is preferred that information be encrypted and flow over the Internet, so that the information should be protected from unauthorized access.

Further, when the computer 40 generates the one-time credit-credit card information in the step 112, it creates random information using a random number(s), so that the third party can not see the order in which the credit-card information is created. In this case, the random number(s) should not be the same as the currently-used one-time information.

In the above structure, the computers 10 and 40 are separately prepared. However, the computers 10 and 40 may be realized on the same computer.

Each of above-described messages will now be described in detail with reference to the accompanying drawings.

Request Message for Requesting One-Time Credit-Card Information

In the step B11 of FIG. 17, the request message, for requesting the one-time credit-card information and which is created by the computer 30 includes both: information representing the requester (purchaser) who requests the one-time credit-card information; and requested-credit-card information representing the contents of the one-time credit-card information, as shown in FIG. 18.

According to this structure, the information representing the purchaser includes: the purchaser name; the actual credit-card number; the expiration date of validity time of the actual credit card; and the password of the actual credit card, as shown in FIG. 18. The requested-credit-card information includes: the expiration date of validity time of the requested one-time credit card; and its password. It is desired that such information regarding the purchaser be encrypted, so that the third party can not understand the information.

According to the above structure, the computer 40 checks the validity of the purchaser information and actual credit-card information of the purchaser, thereafter enabling to create new one-time credit-card information.

One-Time Credit-Card Information Message

The one-time credit-card information message, created at the step 112 shown in FIG. 17, includes the one-time credit-card information generated by the card-information issuing computer 40, as shown in FIG. 19. Note that the one-time credit-card information message does not preferably include the requester information, which is included in the request message for the one-time credit-card information, because it is necessary to do so. This is because the requester information includes information representing the credit-card number, etc., it had better not be on the Internet. Further, for the security sake, the one-time credit-card information is preferably encrypted, so that it can not be understood by the third party.

Order Message

The order message created at the step B 14 shown in FIG. 17 includes, as shown in FIG. 20, an order table including the ordering contents input by the purchaser and the one-time credit-card information. The computer 30 preferably obtains a message digest (an order-table message digest: highly encrypted checksum) by computing the order table using a one-way function, when creating the order message. The computer 30 preferably sets the obtained message digest to be included in the order message, and stores the obtained message digest therein. By so doing, the determination as to whether the information has been altered can be made by performing the same computation with respect to the same order table. This can prevent the data from being altered by someone having malice and from being used for bad purposes. It is preferred that the message digest be calculated after the purchaser inputs an instruction for sending the order message, and be added to the order message. Further, the one-time credit-card information is preferably encrypted.

Corresponding Message

The corresponding message created in the step 114 shown in FIG. 17 includes the actual credit-card information and the one-time credit-card information, as shown in FIG. 21. This corresponding message is sent to the computer 10. Upon reception of the corresponding message, the computer 10 stores the received corresponding message in the corresponding table.

Examination-Request Message

The examination-request message created at the step M12 shown in FIG. 17 includes the order table, the order-table message digest, and the one-time credit-card information, as shown in FIG. 22. In this case, it is preferred that the order-table message digest sent from the computer 30 be used as is. This is because it is not necessary that the computer 20 obtain a new order-table message digest.

Yes/No Message

The yes/no message created at the step P15 of FIG. 17 includes the order table, the order-table message digest and yes/no information. In this case, it is necessary that the computer 10 include the same message-digest calculator as that included in the computer 30. This is because the matching of the order table and the order-table message digest needs to be checked. In addition, the message digest regarding the order table sent to the settlement agency needs to be attached to the yes/no message. Hence, the settlement computer 10 creates the yes/no message which includes the newly-calculated order-table message digest, the order table and the yes/no information therein.

Order-Reception Message

An order-reception message is to be created by the computer 20, in the case where the yes/no information of the yes/no message represents that the settlement can be made for the purchaser. The order-reception message includes the order table, the order-table digest and order-reception data. In this case, the order-table message digest sent from the computer 10 needs to be used as is. This is because in the computer 10B having received the order-reception message determines whether the order table has been altered somewhere on the way of transmission. The order-reception information includes the order-reception number given by the seller (the seller computer 20) and the delivery date of the ordered goods.

Second Example of Seventh Embodiment

Figure 25:
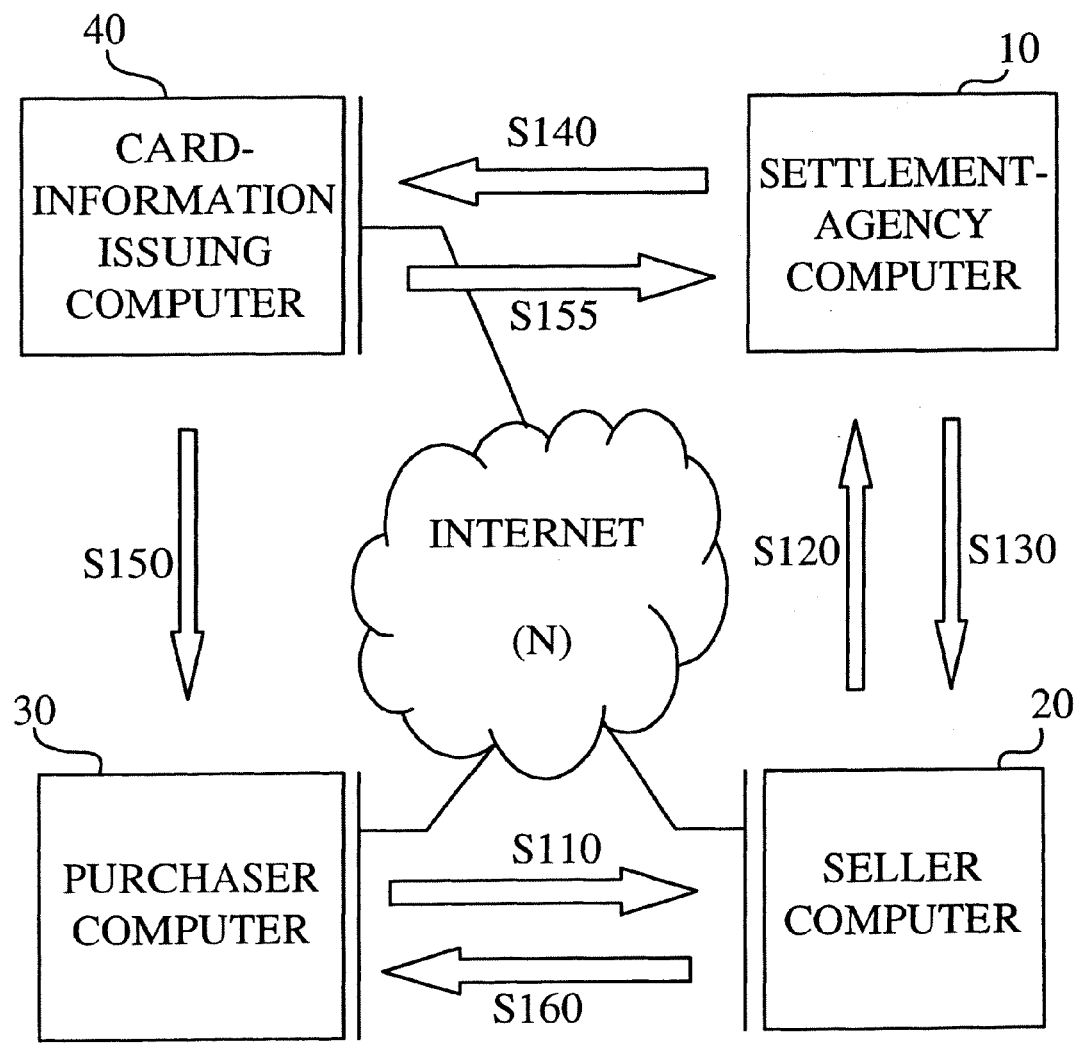
FIG. 25 is a diagram showing a typical electronic commerce system according to the second example of the seventh embodiment of the present invention.

The second example of the seventh embodiment will now specifically be described with reference to the accompanying drawings. FIG. 25 is a diagram showing a typical electronic commerce system according to the second example of the seventh embodiment of the present invention.

As shown in FIG. 25, the computer 30, the computer 20 and computer 40 are connected with each other through the Internet N. Independently from the Internet N, the computer 10 is connected to the computers 40 and 20, through relatively a secure line, such as a private line, a public-telephone line, etc.

In this structure, the computer 30 sends the order table and the one-time credit-card information sent form the computer 40 in advance, to the computer 20 through the Internet N, in the step S10. The computer 20 sends the sent one-time credit-card information and the order table sent from the computer 30 to the computer 10 through a secure line, in the step S120. Then, the computer 20 requests the computer 10 to make the payment for the purchaser. The computer 10 can know the actual credit-card information based on the one-time credit-card information sent from the computer 20, and determines whether to make the payment for the purchaser based on the actual credit-card information and the order table. Then, the computer 10 sends information representing the determination result to the computer 20 through a secure line, in the step S130. The computer 10 informs the computer 40 that the one-time credit-card information has been used through a secure line, in the step S140. The computer 40 creates new one-time credit-card information, sends the created information to the computer 30 through the Internet in the step S150. At the same time, the computer 40 sends corresponding data of the newly-created one-time credit-card information and the actual credit-card information to the computer 10 through a secure line in the step S155. Upon this, the computer 20 informs the computer 30 whether the payment can be made for the purchaser in the step S160. In the case where the payment can be made for the purchaser, the delivery process for delivering the ordered goods is carried out.

Operations of the second example of the seventh embodiment will now be described with reference to the accompanying drawings. In this example, note that the purchaser holds a one-time credit-card information in advance. This is because the settlement agency provides the purchaser with a new one-time-credit card every time the one-time credit-card is used. The one-time credit-card information for the first use is given from the settlement agency, upon signing in a credit-card application form or upon reception of a request for the information.

Figure 26:
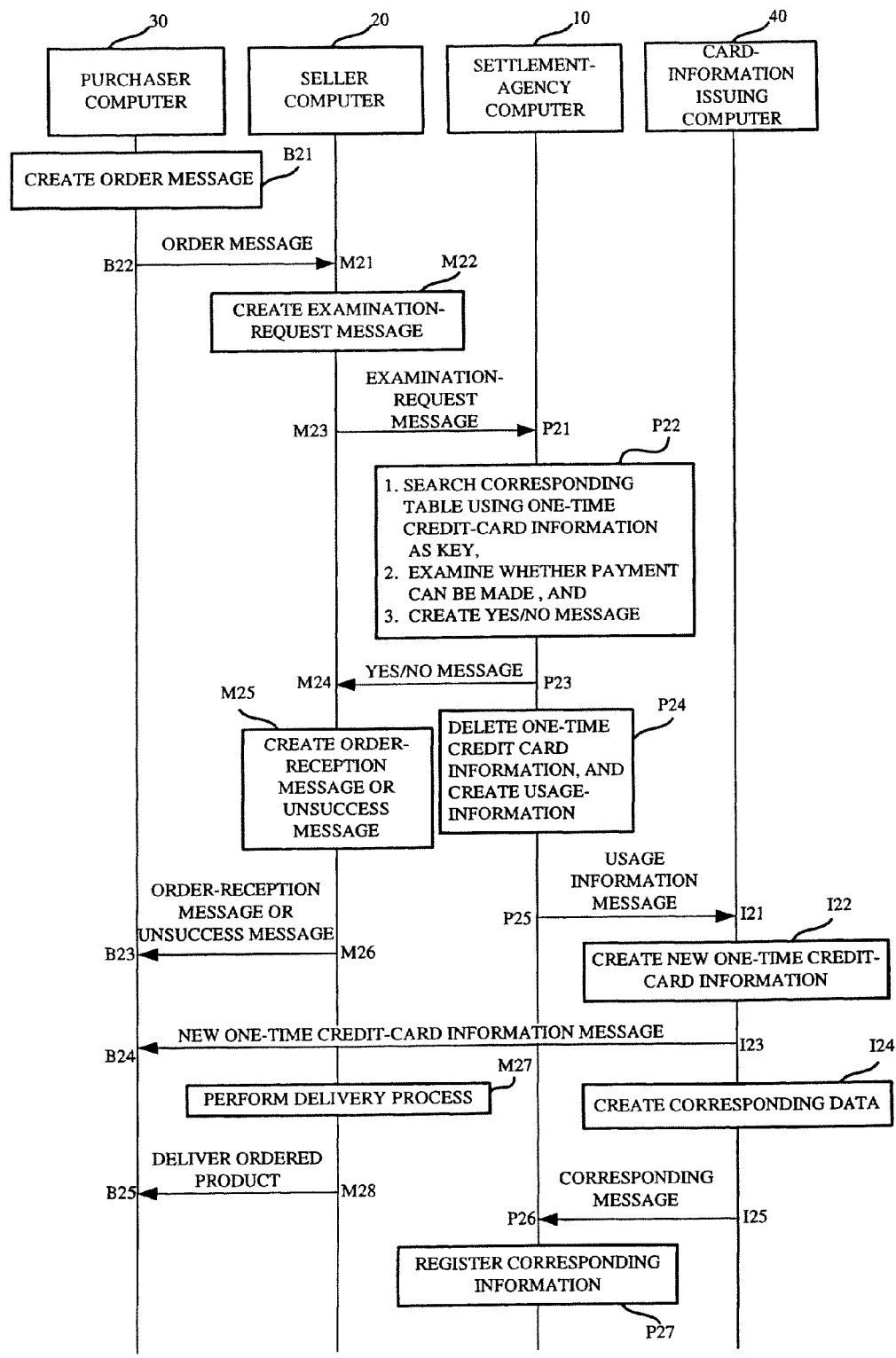
FIG. 26 is a flowchart for explaining an electronic commerce process, which is carried out among a seller computer, a purchaser computer, a settlement agency computer and a card-information issuing computer, which are included in the electronic commerce system of FIG. 25.

With reference to FIG. 26, the purchaser creates an order message by gathering the one-time credit-card information sent in advance from the computer 40, the specified goods to be purchased, the number of the goods, and any other information requested by the seller, using the computer 30 (Step B21). Then, the computer 30 sends the created order message to the computer 20 through the Internet (Step SB22).

The computer 20 receives the order table from the computer 30 (Step M21). The computer 20 creates an examination-request message based on the information included in the order table (Step M22), and sends the created determination-request message to the computer 10 through a secure line (Step M23).

The computer 10 receives the one-time credit-card information from the computer 20 (Step P2). Then, the computer 10 searches the corresponding data, sent from the computer 40 in advance, for corresponding actual credit-card information. After this, the computer 10 determines whether to give credit for payment to be made at maximum, based on the actual credit-card information and other information sent from the compute 20. Subsequently, the computer 10 examines whether to make payment for the purchaser, creates a message (yes/no message) including this payment determination (Step P22), and sends the created message to the computer 20 through a secure line (Step P23).

After this, the computer 10 creates a message (a usage-information message) for informing the computer 40 that the one-time credit-card information has been used (Step P24). The computer 10 sends thus created usage-information message to the computer 40 through a secure line (Step P25-I21), and discards the corresponding data of the used one-time credit-card information and the actual credit-card information from the corresponding table (Step P24).

Instead of using the one-time credit-card information sent from the computer 10 again, the computer 40 creates new one-time credit-card information (Step I22), and sends the created new one-time credit-card information to the computer 30 (Step I23-B24). At the same time, the computer 40 creates the corresponding data of the actual credit-card information and the one-time credit-card information, so as to generate a corresponding message (Step I24), and sends the created corresponding message to the computer 10 through a secure line (Step I25-P26).

The computer 20 creates a message (an order-reception message or a message for informing the computer 30 that the payment can not be made for the purchaser), corresponding to the examination result (regarding the credit transmission) sent form the computer 10. At this time, in the case where the payment can be made for the purchaser, the computer 20 creates an order-reception message representing the order has successfully been made (Step M25). Subsequently, the computer 20 sends the created order-reception message to the computer 30 through the Internet (Step M26-B23), and carries out a delivery process for actually carrying out the ordered goods (M27, M28-B25).

On the contrary, in the case where the payment can not be made for the purchaser, the computer 20 informs the computer 30 that the payment can not be made, through the Internet N 8M26-B23).

In the above example, the credit card is employed. However, the second example of the seventh embodiment can be adapted to any other deferred payment method, using a cash card, a debit card, etc.

As shown in FIG. 26, in the case where information is transmitted through the Internet, it is preferred that information be encrypted and flow over the Internet.

In the case where the computer 40 generates the one-time credit-card information at the step 1122, the computer 40 generates random information using one or more random numbers, so that the third party can not understand in which order the credit-card information has been generated. In this case, the random number can not be the same as the currently-used one-time information.

Furthermore, according to the above structure, the computers 10 and 40 are separately prepared. However, the computers 10 and 40 may be realized on the same computer.

In the second example of the seventh embodiment, each of the order message, the examination-request message, the yes/no message, the order-reception message and the corresponding message has the same structure as that described in the first example of the seventh embodiment of the present invention. In this example, the usage-information message includes the used one-time-credit-card information. In this structure, a new one-time credit-card information message includes one-time credit-card information which has newly been attached by the computer 40.

Third Example of Seventh Embodiment

Figure 27:
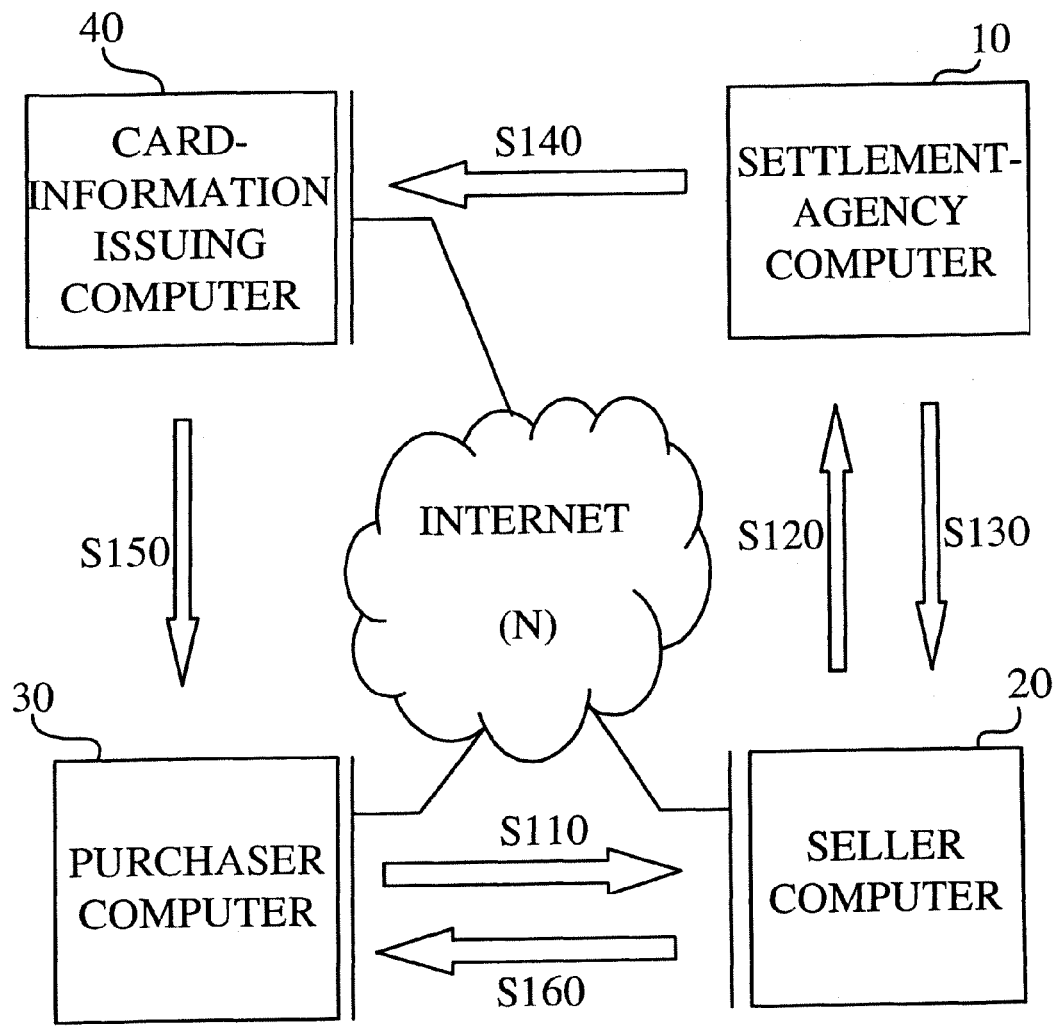
FIG. 27 is a diagram showing a typical electronic commerce system according to the third example of the seventh embodiment of the present invention.

The third example of the seventh embodiment of the present invention will now specifically be explained with reference to the accompanying drawings. FIG. 27 is a diagram showing a typical electronic commerce system according to the third example of the seventh embodiment of the present invention. As shown in FIG. 27, the computers 30, 20 and 40 are connected with each other through the Internet. The computer 10 is connected to the computers 40 and 20 through relatively a secure line, such as a private line or a public telephone line, etc.

In the structure according to the third example of the seventh embodiment, the computer 30 sends the order table and the one-time credit-card information sent form the computer 40, to the computer 20 through the Internet N, in the step S110. The computer 20 sends the one-time credit-card information and the order table sent from the computer 30, to the computer 10 through a secure line, in the step S120, and asks for the payment for the ordered goods for the purchaser, in the step S120. The computer 10 gets the actual credit-card information from the one-time credit-card information sent from the computer 20. The computer 10 determines whether the settlement can be made based on the one-time credit-card information and the order table. Then, the computer 10 sends this determination result to the computer 20 through a secure line, in the step S130. At the same time, the computer 10 creates new one-time credit-card information, and sends the newly-created one-time credit-card information to the computer 40 through a secure line in the step S140. The computer 40 sends the new one-time credit-card information to the computer 30 through the Internet in the step S150. The computer 20 sends the determination result representing whether the settlement can be made, to the computer 30 through the Internet in the step S160. In the case where the settlement can be made, the computer 20 carries out a delivery process for delivering the ordered goods.

Operations of the third example of the seventh embodiment of the present invention will now be described with reference to the accompanying drawings.

Figure 28:
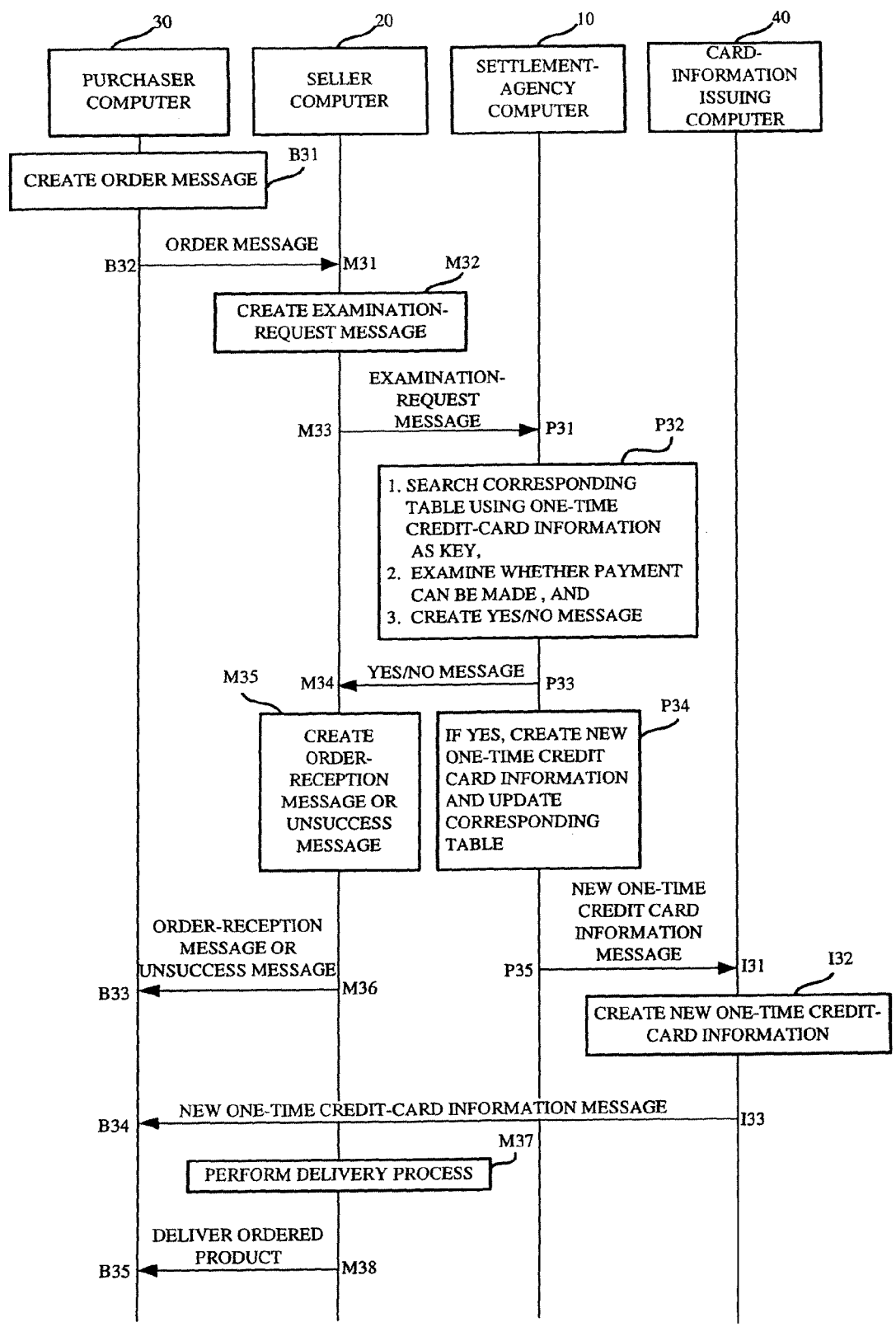
FIG. 28 is a flowchart for explaining an electronic commerce process, which is carried out among a seller, computer, a purchaser computer, a settlement agency computer and a card-information issuing computer, which are included in the electronic commerce system of FIG. 27.

With reference to FIG. 28, the computer 30 creates an order message, by gathering not only the one-time credit-card information from the computer 40, but also the specified goods to be purchased, the number of the goods and any other information required by the seller (B31). Then, the computer 30 sends thus created order message to the computer 20 (B32-M31). Note that the one-time credit-card information for the first use is the same as that of the second example of the seventh embodiment of the present invention.

The computer 20 receives the order table sent from the computer (Step M31). After this, the computer 20 creates an examination-request message, by gathering the sent one-time credit-card information and the information required by the credit-card issuer for examination (M32). Then, the computer 20 sends the created examination-request message to the computer 10 through a secure line (M33-P31), so that the examination as to whether the settlement (for the purchaser) can be made.

The computer 10 searches the one-time credit-card information for the corresponding data, so as to acquire corresponding actual credit-card information. The computer 10 examines whether the settlement can be made, using the actual credit-card information and other information sent from the computer 20. After this, the computer 10 creates an yes/no message (P32), and sends the created yes/no message to the computer 20 through a secure line (P33-M34).

In the case where the settlement can be made for the purchaser, the computer 10 sends the yes/no message to the computer 20, creates new one-time credit-card information. Having performed this, the computer 10 updates the corresponding data of the one-time credit-card information and the actual credit-card information which are registered in the corresponding table (P34). At the same time, the computer 10 sends a new one-time credit-card information message including the created one-time credit-card information, to the computer 40 through a secure line (P35-I31).

In response to this, the computer 40 sends the one-time credit-card information sent form the computer 10 to the computer 30 through the Internet N.

In accordance with the examination result sent form the computer 10, in the case where the payment can be made (for the purchaser), the computer 20 sends an order-reception message to the computer 30 through the Internet N (M36-B33), and carries out a delivery process for actually delivering the ordered goods (M37, M38-B35).

In the case where the yes/no message sent form the computer 10 represents that the settlement can not be made for the purchaser, the computer 20 informs the computer 30 that the order can not successfully be accepted through the Internet N (M36-B33).

In this example of the seventh embodiment of the present invention, the credit card has been employed. However, the example of this embodiment can be realized using any other deferred payment method, employing a cash card, a debit card, etc.

In FIG. 28, when sending information through the Internet, it is preferred that the information be encrypted and flow over the Internet.

Further, in the step P34, in the case where the computer 10 creates the one-time credit-card information, it is preferred that the third party can not understand in which order the credit-card information is created. Note, in this case, that the currently-used one-time information should not be used.

In the example of this embodiment, the computer 10 and the computer 40 have separately been prepared. However, the computer 10 and the computer 40 may be realized on the same computer.

Each of the order message, the examination-request message, the yes/no message, the order-reception message and the new one-time credit-card information message is the same as that described in the second example of this embodiment.

As explained above, according to the seventh embodiment of the present invention, the electronic commerce can be realized, without letting others know the purchaser personal information including his/her deferred payment method. Further, the seller can handle the business transactions while successfully been paid, without changing the existing equipment possessed by the seller.

According to the seventh embodiment of the present invention, the purchaser can get the one-time information regarding the deferred payment, only if needed. Hence, the purchaser does not need to go through an extra process for storing extra information. Further, the personal information of the purchaser can not easily be wiretapped by the third party. Because the purchaser always has the one-time deferred-payment information, he/she does not need to go through the process for particularly acquiring the information. Further, the settlement agency creates and itself, at the same time, manages the corresponding data of the one-time deferred-payment information and the actual deferred-payment information in association with each other. Hence, as compared to the case where the corresponding data is created and managed by a plurality of computers, the corresponding data can easily and securely be created and managed by the settlement agency itself.

The present invention can be employed not only to the deferred payment, using a credit card, etc., but also to an electronic commerce, wherein settlement is achieved using a cash card, debit card, etc.

For example, in the case where the immediate settlement is performed using a debit card, etc., the computer 30 reads a cash card of the purchaser, and inputs a corresponding code number. The computer 30 inputs the ordering data created by the computer 20, so as to provide the computer 10 with the ordering data, information regarding the cash card of the purchaser and the corresponding code number thereof. Upon this, the computer 10 can perform the immediate settlement. That is, a predetermined amount of money for the ordered product can be transferred from the purchaser's account to the seller's account. The computer 10 sends information about completion of the settlement to the computer 20, while the cash card information and the code number is kept secret, thereby informing the seller that the settlement is completed. Then, the ordered product can successfully be provided to the purchaser. In this way, the cash card information and the code number are kept secret, so that the computer 20 can not acquire such information. That is, the seller can not obtain the cash card information and the code number. Since the ordering data is created by the computer 20, the seller or settlement agency can know whether the ordering data has been altered, and hence realizing a high level of security for the seller. In the data communications between each of the computers 10, 20 and 30, the message digest may be added to the data items to be transmitted, or the data items to be transmitted may be encrypted, and thus enhancing the security of the immediate settlement. In the seventh embodiment, for example, the purchaser computer 30 sends the debit card number to the card-information-issuing computer 40, and the card-information-issuing computer 40 generates one-time-debit-card number and corresponding data associating the original debit card number and the one-time-debit-card number, and sends the generated one-time debit card number to the purchaser computer 30 and the corresponding data to the settlement agency computer 10.

The apparatus and system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications No. 2001-069142 filed on Mar. 12, 2001 and No. 2001-148005 filed on May 17, 2001 and including specification, claims, drawings and summary. The disclosure of the above Japanese Patent Applications is incorporated herein by reference in its entirety.

What is claimed is:

1. An electronic commerce method comprising:
   an ordering-data receiving process of
      receiving, at a settlement agency terminal device from a purchaser terminal device, ordering data including price information representing a price of a target product to be purchased and personal information including payment card information and ID information which have previously been given to a purchaser for sales, via a network, the payment card information being communicated between the purchaser terminal device and the settlement agency terminal device, without being communicated to a seller terminal device,
      receiving, at the settlement agency terminal device from the purchaser terminal device, a first message digest corresponding to a first shorter form of the ordering data, the first message digest being created by the seller terminal device, and receiving, at the settlement agency terminal device from the purchaser terminal device, a second message digest corresponding to a second shorter form of the ordering data, the personal information, and the first message digest, the second message digest being created by the purchaser terminal device;

a payment determination process of determining, at the settlement agency terminal device, whether to pay the price of the target product to the seller terminal device, based on the price information included in the received ordering data, and the payment card information and the ID information included in the received personal information; and a settlement-permission information sending process of sending, by the settlement agency terminal device, in response to the determining to pay the price of the target product for the purchaser, settlement permission information representing a determination to pay the price for the purchaser to the seller terminal device through the network.

2. The electronic commerce method according to claim 1, wherein the ordering data is generated by the seller terminal device, transmitted to the purchaser terminal device via an electronic medium, and the personal information is added to the ordering data by the purchaser terminal device.

3. The electronic commerce method according to claim 1, further comprising the process of:

downloading, into the purchaser terminal device, a program for adding the personal information to the ordering data provided from the seller terminal device, every time the purchaser makes an order for a target product, wherein said ordering-data receiving process receives data items including the personal information which has been added to the ordering data in accordance with the program downloaded into the purchaser terminal device.

4. The electronic commerce method according to claim 1, wherein the created first message digest is added to the ordering data, and the ordering data with the first message digest added thereto is sent to the purchaser terminal device, said receiving process receives the ordering data sent by the seller terminal device and the first message digest, to which the personal information is added, from the purchaser terminal device, and said settlement information sending process sends data items, including the settlement permission information, the ordering data, and the first message digest, to the seller terminal device, in response to sending the settlement permission information to the seller terminal device.

5. The electronic commerce method according to claim 4, further comprising a determination process of:

acquiring, at the settlement agency terminal device, a first forming technique employed for creating the first message digest in the first shorter form of the ordering data, before performing at least said payment determination process;

comparing the ordering data received from the purchaser terminal device with the first message digest, using the acquired first forming technique; and determining validity of the ordering data.

6. The electronic commerce method according to claim 4, wherein said receiving process receives the first message digest, the ordering data, and the personal information, to which the second message digest is added.

7. The electronic commerce method according to claim 6, further comprising a determination process of:

acquiring, at the settlement agency terminal device, a second forming technique employed for creating the second message digest in the second shorter form by the purchaser terminal device, before performing at least the payment determination process;

comparing, using the acquired second forming technique, the ordering data received from the purchaser terminal device, the personal information, the first message digest, and the second message digest; and determining validity of the ordering data.

8. The electronic commerce method according to claim 1, wherein said settlement-information sending process further includes:

generating a third message digest from data items including the settlement permission information and the ordering data, in a third shorter form than the data items; and sending the data items including the third message digest, the settlement permission information, and the ordering data to the seller terminal device.

9. The electronic commerce method according to claim 8, further comprising a sharing process of:

comparing, at the seller terminal device using a third forming technique used for forming the third message digest, the third message digest with the data items including the settlement permission information and the ordering data.

10. The electronic commerce method according to claim 6, wherein said settlement-information sending process further includes:

forming a third message digest from data items including the settlement permission information, the ordering data, and the first message digest in a shorter form than the data items; and sending data items including the third message digest, the settlement permission information, the ordering data, and the first message digest to the seller terminal device.

11. The electronic commerce method according to claim 10, further comprising a sharing process of:

comparing, at the seller terminal device using a third forming technique employed for generating the third message digest, the third message digest with the data items including the settlement permission information, the ordering data, and the first message digest.

12. The electronic commerce method according to claim 11, further comprising a sending process of:

sending the ordering data and order-reception information representing that an order for the target product has been received, to the purchaser terminal device from the seller terminal device, in response to determining to pay at said payment determination process; and sending the ordering data and the settlement permission information to the seller terminal device.

13. The electronic commerce method according to claim 12, further comprising:

forming a fourth message digest from data items including the order-reception information and the ordering data, in a fourth shorter form than the data items, by the seller terminal device; and sending data items including the fourth message digest, the order-reception information, and the ordering data to the purchaser terminal device from the seller terminal device.

14. The electronic commerce method according to claim 13, further comprising:

sharing, between the seller terminal device and the purchaser terminal device, a fourth forming technique, employed by the seller terminal device for forming the fourth message digest.

15. An electronic commerce system comprising:

a seller terminal device;

a purchaser terminal device configured to send ordering data including price information representing a price of a target product to be purchased and personal information including payment card information and ID information which have previously been given to a purchaser for sales, via a network; and a settlement agency terminal device configured to receive, from the purchaser terminal device, the ordering data, receive, from the purchaser terminal device, a first message digest corresponding to a first shorter form of the ordering data, the first message digest being created by the seller terminal device, receive, from the purchaser terminal device, a second message digest corresponding to a second shorter form of the ordering data, the personal information, and the first message digest, the second message digest being created by the purchaser terminal device, determine whether to pay the price of the target product to the seller terminal device, based on the price information included in the received ordering data, and the payment card information and the ID information included in the received personal information, and send, in response to determining to pay the price of the target product for the purchaser, settlement permission information representing a determination to pay the price for the purchaser to the seller terminal device through the network, wherein the payment card information is communicated between the purchaser terminal device and the settlement agency terminal device, without being communicated to the seller terminal device.

* * * * *